(12) United States Patent
Lu et al.

(10) Patent No.: US 12,328,390 B2
(45) Date of Patent: Jun. 10, 2025

(54) IDENTITY AND PRIVACY PRESERVATION IN ASYNCHRONOUS COMMUNICATIONS

(71) Applicant: THALES DIS France SAS, Meudon (FR)

(72) Inventors: HongQian Karen Lu, Austin, TX (US); Asad Ali, Austin, TX (US); Michael Hutchinson, Cedar Park, TX (US)

(73) Assignee: THALES DIS FRANCE SAS, Meudon (FR)

( * ) Notice: Subject to any disclaimer, the term of this patent is extended or adjusted under 35 U.S.C. 154(b) by 478 days.

(21) Appl. No.: 17/830,398

(22) Filed: Jun. 2, 2022

(65) Prior Publication Data

US 2023/0396418 A1 Dec. 7, 2023

(51) Int. Cl.
*H04L 9/40* (2022.01)
*H04L 9/08* (2006.01)
*H04L 9/32* (2006.01)
*H04L 67/55* (2022.01)

(52) U.S. Cl.
CPC .......... *H04L 9/0847* (2013.01); *H04L 9/0825* (2013.01); *H04L 9/3236* (2013.01); *H04L 67/55* (2022.05); *H04L 2209/04* (2013.01)

(58) Field of Classification Search
CPC ............. H04L 63/0407; H04L 63/0421; H04L 9/0847; H04L 9/0825; H04L 9/3236; H04L 2209/04; H04L 67/55
See application file for complete search history.

(56) References Cited

U.S. PATENT DOCUMENTS

| | | | |
|---|---|---|---|
| 9,191,381 B1 | 11/2015 | Popp et al. | |
| 9,294,457 B2 | 3/2016 | Guo et al. | |
| 2005/0114701 A1 | 5/2005 | Atkins et al. | |
| 2007/0184819 A1 | 8/2007 | Barriga-Caceres et al. | |
| 2007/0209066 A1 | 9/2007 | Timmerman et al. | |
| 2008/0242272 A1* | 10/2008 | Patel ...................... | G06Q 30/02 455/414.1 |

(Continued)

OTHER PUBLICATIONS

Tulshibagwale, A. et al., OpenID Shared Signals and Events Framework Specification 1.0—draft 01, The OpenID Foundation, 2021, accessed on Jan. 15, 2022.

*Primary Examiner* — Thaddeus J Plecha

(57) ABSTRACT

Ensuring user privacy in a publisher-subscriber communications environment. Storing, by a user-identifier mapping server, a user-identity database mapping user identity to subscriber-anonymized user identifier and subscriber identifier for users of said plurality of subscribers. Receiving, by the user-identifier mapping server, an information-request message from a subscriber, the information-request message concerning a notification message from a publisher, the notification message including an anonymized username of a first user of the publisher and wherein the username of the first user is anonymized using the one-way anonymization function. Upon receiving, by the user-identifier mapping server, the information-request message, determining from the user-identity database whether the first user is a user of the subscriber and transmitting a response message to subscriber indicating whether the first user is a user of the subscriber.

30 Claims, 19 Drawing Sheets

(56) References Cited

U.S. PATENT DOCUMENTS

2011/0302185 A1* 12/2011 Vincent .................. G06F 16/951
  707/765
2019/0058706 A1   2/2019 Feijoo et al.
2021/0216536 A1*  7/2021 Rogers .................. G06F 16/958

* cited by examiner

N1 USERLIST

| USERIDENTIFIER | USER-IDENTIFIER HASH |
|---|---|
| HUNNICUTT | 0x1f2837c3c8765121 |
| HAWKEYE | 0x7cfa40f92fd49bd1 |
| MARGARET | 0x2d107f33c1031ba5 |
| RADAR | 0xbd14457c3264523 |

501

N2 USERLIST

| USERIDENTIFIER | USER-IDENTIFIER HASH |
|---|---|
| HUNNICUTT | 0x1f2837c3c8765121 |
| HAWKEYE | 0x7cfa40f92fd49bd1 |
| MULCAHY | 0x36c047fdcdec1f77 |

502

N3 USERLIST

| USERIDENTIFIER | USER-IDENTIFIER HASH |
|---|---|
| HUNNICUTT | 0x1f2837c3c8765121 |
| HAWKEYE | 0x7cfa40f92fd49bd1 |
| KLINGER | 0x6d033af26c13e7d6 |

503

N4 USERLIST

| USERIDENTIFIER | USER-IDENTIFIER HASH |
|---|---|
| MARGARET | 0x2d107f33c1031ba5 |
| RADAR | 0xbd14457c3264523 |
| BURNS | 0x3d3494fad4013105 |
| HUNNICUTT | 0x1f2837c3c8765121 |

N1 USERLIST

| USER IDENTIFIER | USER-IDENTIFIER HASH |
|---|---|
| HUNNICUTT | 0x1f2837c3c8765121 |
| HAWKEYE | 0x7cfa40f92fd49bd1 |
| MARGARET | 0x2d107f33c1031ba5 |
| RADAR | 0xbd14457c3264523 |

} 1001

N2 USERLIST

| USER IDENTIFIER | USER-IDENTIFIER HASH |
|---|---|
| BJHUNNICUTT | 0x4ae307a466ee26c2 |
| HAWKEYEPIERCE | 0x136be84a994389d5 |
| MULCAHY | 0x36c047fdcdec1f77 |

} 1002

N3 USERLIST

| USER IDENTIFIER | USER-IDENTIFIER HASH |
|---|---|
| CAPTAINH | 0x1eb61b79ee0b69f5 |
| BENJAMINPIERCE | 0xb9ad828b0a33253 |
| KLINGER | 0x6d033af26c13e7d6 |

} 1003

N4 USERLIST

| USER IDENTIFIER | USER-IDENTIFIER HASH |
|---|---|
| HOULIHAN | 0x26c38be73269072e |
| RADAROREILLY | 0x2d4dcb1c6ad19faf |
| BURNS | 0x3d3494fad4013105 |
| CAPTHUNNICUTT | 0x6189d656d9d38c0d |

| TP USER ID | NODE NAME | NODE USERIDENTIFIER-HASH | NODE USER IDENTIFIER |
|---|---|---|---|
| 1001 | N1 | 0x1f2837c3c8765121 | HUNNICUTT |
| 1002 | N1 | 0x7cfa40f92fd49bd1 | HAWKEYE |
| 1003 | N1 | 0x2d107f33c1031ba5 | MARGARET |
| 1004 | N1 | 0xbd14457c3264523 | RADAR |
| 1001 | N2 | 0x4ae307a466ee26c2 | BJHUNNICUTT |
| 1002 | N2 | 0x136be84a994389d5 | HAWKEYEPIERCE |
| 1005 | N2 | 0x36c047fdcdec1f77 | MULCAHY |
| 1001 | N3 | 0x1eb61b79ee0b69f5 | CAPTAINH |
| 1002 | N3 | 0xb9ad828b0a33253 | BENJAMINPIERCE |
| 1006 | N3 | 0x6d033af26c13e7d6 | KLINGER |
| 1003 | N4 | 0x26c38be73269072e | HOULIHAN |
| 1004 | N4 | 0x2d4dcb1c6ad19faf | RADAROREILLY |
| 1007 | N4 | 0x3d3494fad4013105 | BURNS |
| 1001 | N4 | 0x6189d656d9d38c0d | CAPTHUNNICUTT |

| NODE NAME | MASKED NODE NAME |
|---|---|
| N1 | 0x6ac4303ab4d1de9c |
| N2 | 0x15b37baead51cca8 |
| N3 | 0x5849189316a5ef4c |
| N4 | 0x588a70fd3298be47 |

IDENTITY AND PRIVACY PRESERVATION IN ASYNCHRONOUS COMMUNICATIONS

BACKGROUND OF THE INVENTION

The present invention relates, generally, to publisher-subscriber frameworks, and, more particularly, to protecting against divulgation of identity and privacy related to broadcast communications in such frameworks.

A publisher-subscriber model is a mechanism in which networked nodes may asynchronously transmit messages to other nodes. A sender, known as a publisher, sets up a topic or creates an event and publishes the messages related to the topics to other nodes, known as subscribers, who subscribe to the topic or event from the publisher. In other words, when a publisher publishes a message regarding a topic or event, nodes that subscribe to the topic or event receive the published messages. Messages may have some filtering parameter associated with them, e.g., a topic, or may be restricted to certain sets of subscribers, e.g., members of a particular organization or function.

The Continuous Access Evaluation Profile (CAEP) framework from the OpenID Foundation is an example publisher-subscriber framework. CAEP is described in Tulshibagwale, A. et al., OpenID Shared Signals and Events Framework Specification 1.0—draft 01, The OpenID Foundation, 2021, accessed on Jan. 15, 2022, incorporated in its entirety herein by reference.

Typically, rather than sending messages to specific nodes, a publisher makes messages available without knowledge of which subscribers will have access to the messages and, conversely, a subscriber subscribes to a topic of interest to the subscriber.

Consider a network of service providers that potentially have a number of common users. These service providers may be networked in a publisher-subscriber framework for sharing messages among themselves. There may be topics related to network administration, to network status, to best practices, to advertising opportunities, etc.

Service providers typically monitor user activity for diagnostic purposes, for trouble shooting, and to detect unusual user behavior. Such monitoring may convey activity information related to particular users. For example, if a user accesses a service through a federated identity system, if the user's login credentials have been compromised and that has been detected by one service provider, that service provider may wish to communicate that situation to other service providers that also allow the user to login using the same federated identity system. Conversely, a user's good or trust-worthy behavior may also be valuable to share within service providers.

However, broadcasting the username to all service providers that have access to messages on a topic related to user issues would reveal information that some of those service providers are not entitled to. For example, such a message would reveal the user identity to service providers who do not have the user as one of its users. Furthermore, even if the user is a member of a subscriber service provider, the broadcast message would reveal that the user is a member of the publisher service provider, which may not be in the interest of either the publisher or the user.

From the foregoing it is apparent that there is a need for an improved method to publish messages in a publisher-subscriber framework without revealing user identity and membership status.

SUMMARY

An embodiment of the invention ensures user privacy in a publisher subscriber communication environment having at least one publisher node and a plurality of recipient subscriber nodes in relation to publisher-subscriber communication regarding user activity, by storing, by a user-identifier mapping server, a user-identifier database mapping user identifier to subscriber-anonymized user identifier and subscriber identifier for users of said plurality of subscribers, receiving, by the user-identifier mapping server, an information-request message from a recipient subscriber node, the information-request message concerning a notification message from a publisher node, the notification message including an anonymized user identifier of a first user of the publisher node and wherein the user identifier of the first user is anonymized using the one-way anonymization function, and upon receiving, by the user-identifier mapping server, the information-request message, determining from the user-identifier database whether the first user is a user of the recipient subscriber node and transmitting a response message to the recipient subscriber node indicating whether the first user is a user of the recipient subscriber node.

The notification message may include a masked identifier of the publisher, e.g., an encryption of the publisher identifier using a public key of the mapping server, and the method further comprises unmasking, e.g., decrypting using the private key of the mapping server, by the user-identifier mapping provider, the masked publisher identifier to determine the corresponding publisher identifier.

The user-identifier mapping may be a trusted-third party server or an identity provider server, and the publisher and the subscriber may be service providers.

The user identifier may be anonymized using a one-way function that is a cryptographic hash function. The user identifier may be anonymized using a one-way function pre-agreed upon between the user-identifier mapping server and the plurality of subscriber nodes.

The notification message may include an anonymized identifier of the publisher node, the method further comprising utilizing the anonymized identifier of the publisher node in the step of determining from the user-identity database the user identity corresponding to the anonymized user identifier of the first user. The notification message may contain content relevant to a user corresponding to the anonymized user identifier and the response message may contain content relevant to the user corresponding to the anonymized user identifier.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 is a schema of the user-identifier tables of FIG. 3 with hashed user-identifiers that may be used to protect the identity of users in published events.

FIG. 10 is a schema of user-identifier tables of FIG. 4 with hash results for users having different user-identifiers for several nodes.

FIG. 11 is a schema of user identifiers, hashes, and common identity used by a mapping server to map user-identifier hashes from one node to another node.

DETAILED DESCRIPTION OF THE INVENTION

Figure 1:
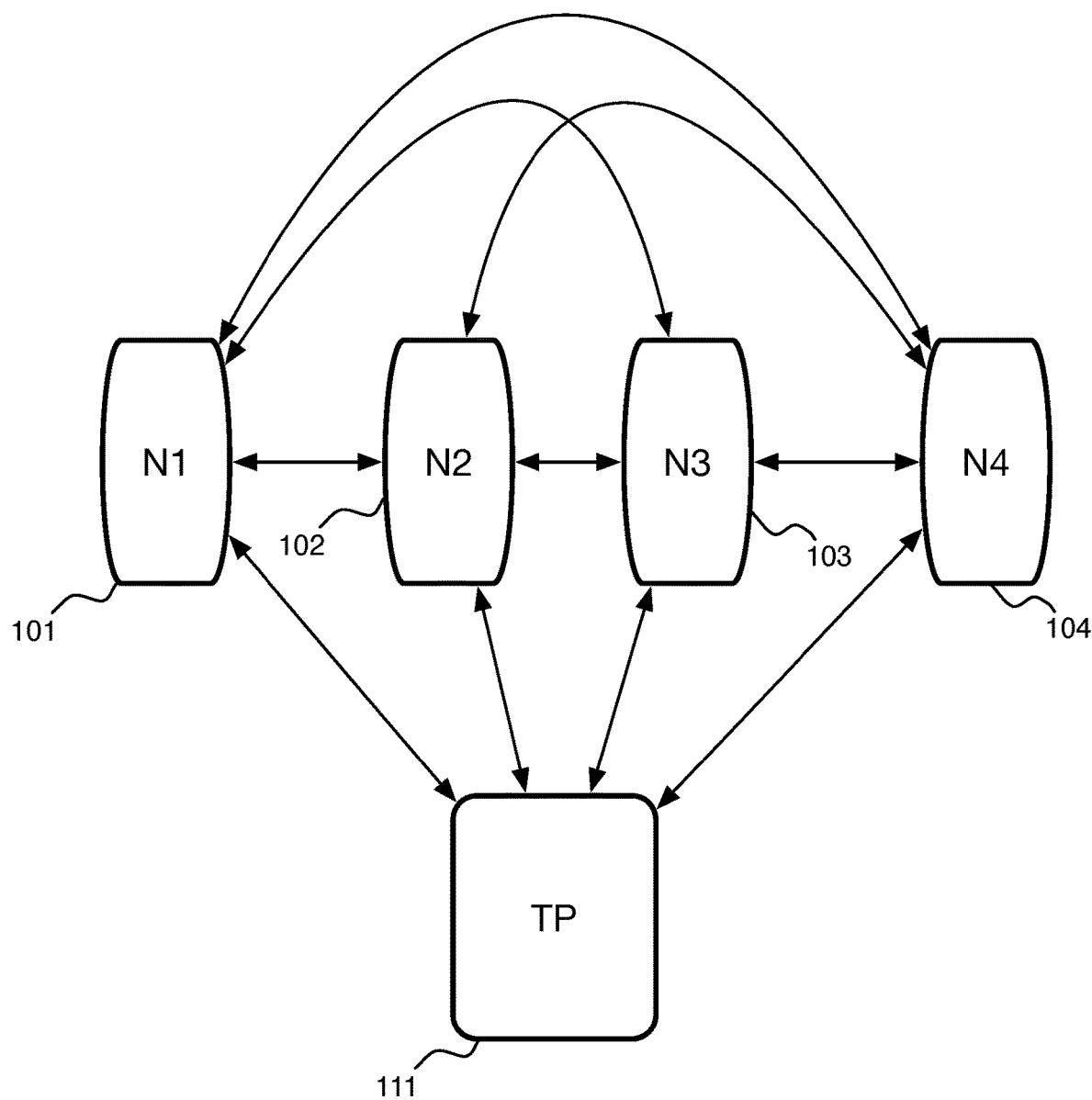
FIG. 1 is an illustration of a first model for asynchronous communication among nodes in a publisher-subscriber framework with several nodes wherein each node may publish messages directly to any another node.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides a mechanism for enhancing privacy and identity protection in a communications network that deploys a publisher-subscriber framework for communicating information concerning user activity among nodes participating in the communications network.

As described in greater detail herein below, the herein-described technology allows asynchronous communications between publishers and subscribers, using protocols such as CAEP, among participants about events associated with users without unnecessarily revealing user and/or publisher information to receiving parties.

For the ease of description, all parties involved in this publisher/subscriber framework are referred to herein as "nodes". Each node can be a publisher, a subscriber or both. In addition, a special node is referred to as a "trusted third-party node". As is described herein below, the trusted third-party node provides (among other functions) user-identifier mapping services, i.e., the third-party node may be a user-identifier mapping server. Other nodes use this user-identifier mapping server node so that the following three security outcomes are achieved:

1. Protect User ID (same ID). Identity of user inside a message is protected. A subscriber node will see this identity only if they are allowed to. For example, only if that user has an account at this node.
2. Protect User's Membership at the Publisher. Identity of the publishing node is hidden. A subscriber node will not see which publishing node sent the message. Thereby information about user membership at the publisher node is protected.
3. Protect User ID (different IDs). Users with different identifiers at each nodes (e.g., different user names) can still be identified correctly. That is security outcome #1 above will still hold even if a same user has different identifiers at publisher and subscriber nodes.

To ensure the three desired security outcomes described in previous section are achieved, there can be two possible modes of how nodes exchange information. These modes are described in FIGS. 1 and 2, respectively.

FIG. 1 is an illustration of a direct-communication model 100 for asynchronous communication among a network of nodes, including a first node N1 101, a second node N2 102, a third node N3 103, and a fourth node N4 104 that communicate with each other over a publisher/subscriber framework. The information in the messages among the nodes are anonymized (to ensure the three security outcomes described above). The receiving nodes N1 101 through N4 104 therefore also communicate with a special node, a trusted third party (TP) 111, to decipher the information received.

The TP 111 may be inside or outside of the publisher/subscriber system.

While asynchronous communication among the nodes are described in the context of a publisher/subscriber framework, e.g., CAEP, the techniques described herein are applicable to other frameworks for asynchronous communication among a collection of nodes.

Figure 2:
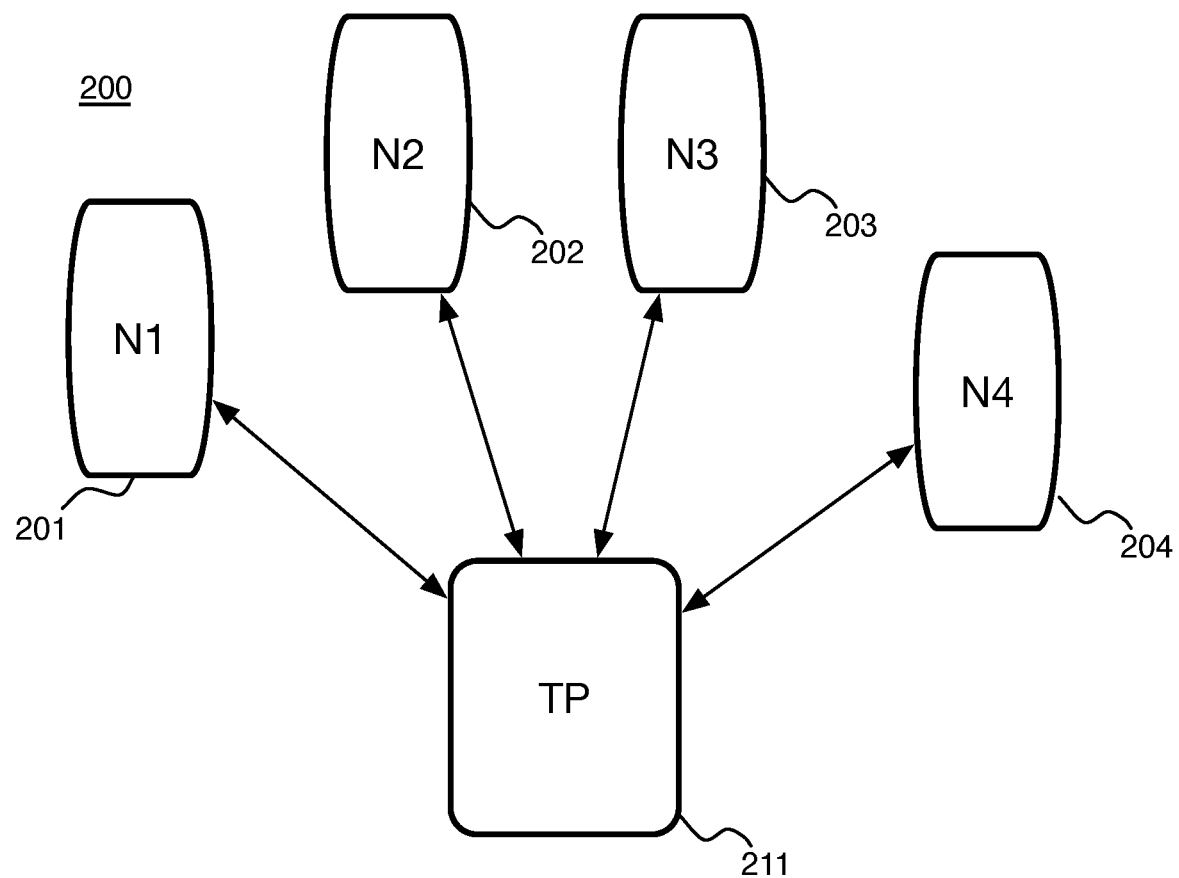
FIG. 2 is an illustration of a second model for asynchronous communication among several nodes in a publisher-subscriber framework wherein nodes publish messages indirectly to other nodes via a trusted third party.

FIG. 2 is an illustration of an indirect-communication publisher-subscriber model 200. In this scenario, publishers, e.g., any of the nodes N1 201, N2 202, N3 203 through N4 204, do not send messages directly to each other. Rather, each node publishes messages via a trusted third party 211. The trusted third party 211 informs all the subscribers, which again can be any subset of the nodes N1 201 through N4 204, of published messages. Nodes N1 201 through N4 204 correspond to nodes N1 101 through N4 104 of FIG. 1 and the trusted third party 211 of FIG. 2 corresponds to the trusted third party 111 of FIG. 1. Thus, references herein to any of nodes 101 through 104 and the trusted third party 111 apply equally to the nodes 201 through 204 and the trusted third party 211, and vice versa, unless expressly stated otherwise.

In an embodiment, the nodes N1 101 through N4 104 are service providers that provide services to a number of users. These users may be common to the several nodes and may have identical user identifiers or different user identifiers at the various nodes. These service-provider nodes may be participants in a federated identity management system, in which case, the trusted third party TP 111 may be an Identity Provider (IdP) that provides federated authentication and login services for the service providers. However, the techniques described herein are applicable to other frameworks.

In the context of federated identity management, for a user to log in to anyone of the nodes, node N1 101 through node N4 104, the user logs into an account at the trusted party 111, e.g., an IdP. By logging in to the trusted third party 111, the user may then, when logging into a service provider node, e.g., node N2 102, with which the user has an account, direct the node to obtain the login credentials from the trusted third party 111. The trusted third party 111, which in that case is an identity provider, may then perform an authentication of the user and if the authentication is successful, indicate to the node the corresponding user id for the user. Alternatively, the user may be re-directed to the trusted third party 111 when the user tries logging in to one of the nodes N1 101 through N4 104. After authentication at the trusted third party 111, the user is re-directed back to original node.

As with the network model of FIG. 1, the nodes N1 201 through N4 204 may rely on the trusted third party 211 for user authentication services. Communication between nodes N1 201 through N4 204 and the trusted third party 211 for authentication purposes uses a separate protocol and is not through the publisher-subscriber framework.

Each of the nodes, N1 101 through N4 104, may publish informational messages to other nodes as well as to the identity provider 111. These notification messages may provide some information pertaining to a particular user. The notification messages may indicate, for example, that the user is suspected of being an impostor, that the user is misbehaving in some fashion (accessing unauthorized files, deleting files, editing files without authorization, etc.), or that the user's activity is noteworthy for some other reason.

As described hereinabove, the nodes N1 101 through N4 104 each have a number of users (not shown in either FIG. 1 or FIG. 2). The nodes may have users in common.

Figure 3:
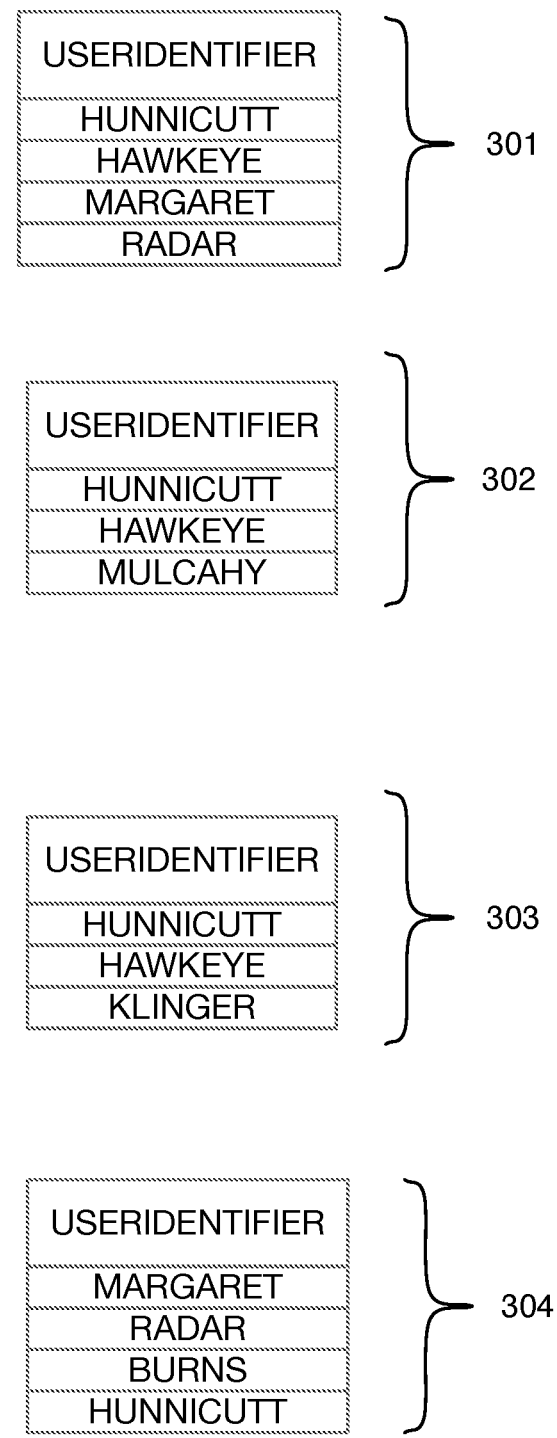
FIG. 3 is a schematic illustrating user-identifier table in an example scenario of users in common and unique users associated with four nodes.

FIG. 3 is a schematic illustrating user-identifier tables in an example scenario of users in common and unique users associated with four nodes. The node N1 may have the users indicated in table 301; the node N2 may have the users indicated in table 302; the node N3 may have the users indicated in table 303; and the node N4 may have the users indicated in table 304.

As can be seen, some nodes may have common users with other nodes. For example, users HUNNICUTT and HAWKEYE have accounts on N1, N2, and N3, and MARGARET and RADAR have accounts on N1 and N4; HUNNICUTT also has an account on N4; however, nodes may have some unique users, e.g., MULCAHY, KLINGER, and BURNS.

Another aspect of the user tables 301 through 304 is that the users have the exact same user identifier with all four nodes. However, that is often not the case. As illustrated in user-identifier tables 401, 402, 403, and 404 of FIG. 4, even though a user by the name Captain B. J. Hunnicutt has accounts at all four nodes, he uses different user identifiers HUNNICUTT, BJHUNNICUTT, CAPTAINH, CAPTHUNNICUTT, respectively, at the four nodes. Similarly, HAWKEYE, MARGARET, and RADAR use alternative names at nodes N2, N3, and N4 as illustrated in tables 402, 403, and 404, respectively.

As noted hereinabove, nodes typically monitor user behavior for a several purposes, e.g., performance monitoring, troubleshooting, and attack prevention. A node may, for example, detect that a user's authentication credentials have been compromised, that the user behaves in an atypical manner (e.g., accesses areas that the user does not have a reason to access), deletes or edits files that the user would normally only read, uses an unusual amount of resources. When a node has determined problems associated with a user, the node may wish to transmit a notification message to the other nodes indicating that the user is a trouble user. To do so, in a publisher-subscriber framework, the node publishes the notification to the other nodes.

Consider the user table of FIG. 3 and assuming that all the nodes are subscribers to user-related notification messages, if N1 101 publishes a notification message that a user by the name Margaret Houlihan, having a user identifier MARGARET, is a trouble user, while that may be relevant to N4 (where MARGARET also has an account), N2 and N1 have discovered some information, namely, the identity of MARGARET and that she has an account at N1. Even N4 has discovered information that it may not be entitled to, namely, that MARGARET has an account at N1.

To address the above problems, parties in the federation can anonymize user identifiers when sending a message. In a first mechanism to anonymize the users, the nodes hash user-identifying information, e.g., username, when sending out messages in a publisher-subscriber framework by using an irreversible one-way function.

The user-identifier and hash tables 501 through 504 FIG. 5, which corresponds to user-identifier tables 301 through 304 of FIG. 3, provide an illustrative example. For each user identifier, the tables 501, 502, 503 and 504 contain a hash (in the example, which is provided as an illustrative example, the hash is produced using the hash function built into Python 3) of the user identifier. When building a notification message concerning one of its users, a service-provider publisher includes the hash of the user-identifying information rather than the actual user identifier.

When a subscriber node accesses a notification with such a hashed user-identifying information, the subscriber node can check its own user table to determine if it has a user with that hash. However, any node that does not have a user that matches the corresponding hash, has learned nothing.

Figure 6:
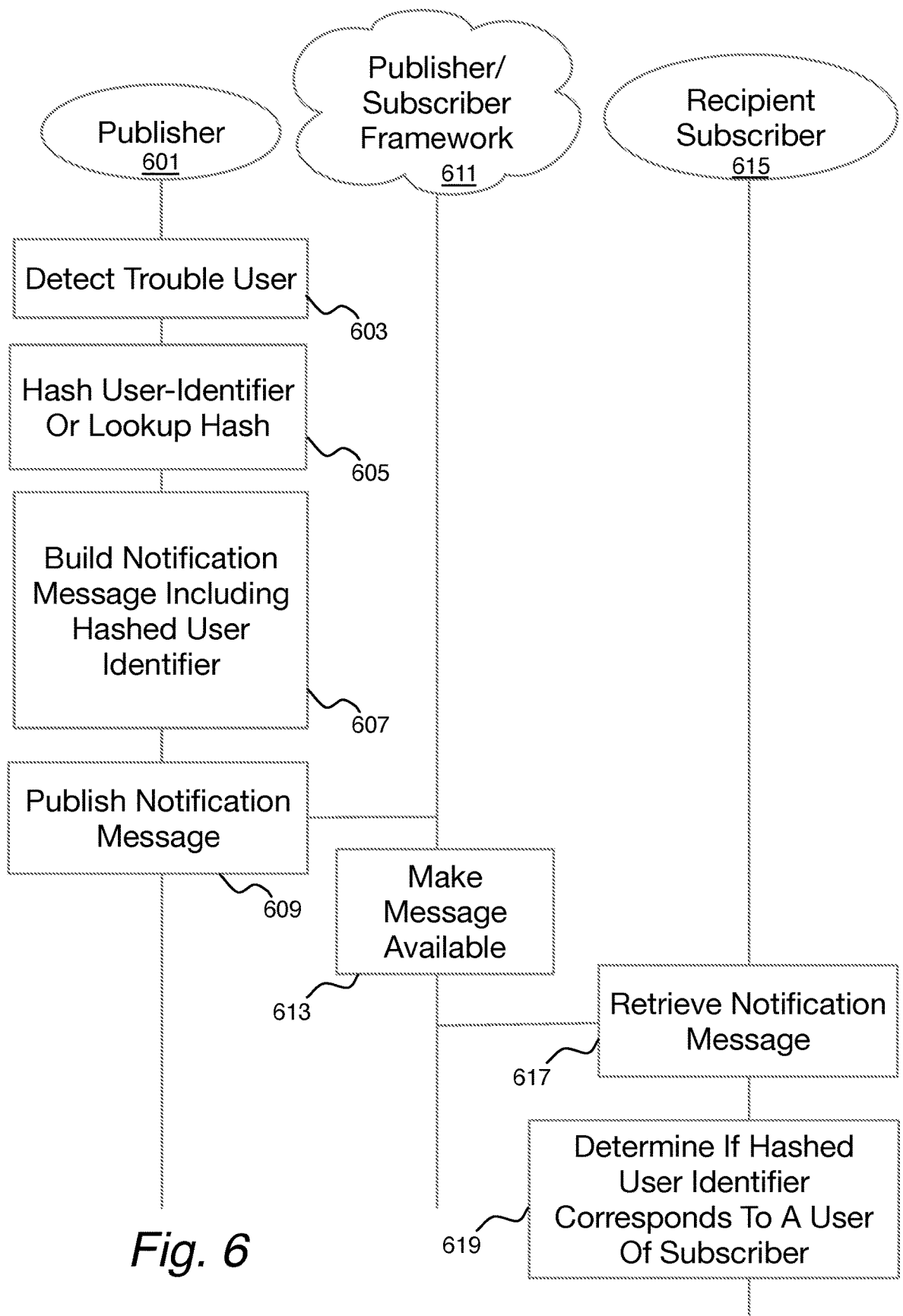
FIG. 6 is a timing sequence diagram illustrating a first mechanism for anonymizing user-identifying information in a publisher-subscriber framework.

FIG. 6 is a timing-sequence diagram illustrating the first mechanism for anonymizing user-identifying information in a publisher-subscriber framework, described hereinabove.

A publisher 601, which may be a node such as any of the nodes N1 101/201 through N4 104/204, detects 603 an issue with one of its users.

The publisher 601 determines 605 the hash for the user-identifying information, e.g., hash of the user identifier.

The hash function maybe any irreversible one-way hash. Examples include cryptographic hash functions, such as the Secure Hash Algorithm (SHA) family, e.g., the SHA-2 family (SHA-224, SHA-256, SHA-384, SHA-512, SHA- 512/224, SHA-512/256), and message-digest family of cryptographic hash functions, e.g., keyed-hash message authentication code (HMAC). The various nodes may also have an agreed-upon internal one-way function for providing a one-way encoding of user-identifying information. Herein, one-way function and one-way hash includes all such alternative hash and irreversible one-way functions.

The publisher 601 may determine hash of user-identifying information on an as-needed basis or may store the user-identifying information in some form of database tables, e.g., as illustrated in FIG. 5.

The publisher 601 builds 607 a notification message, e.g.:
"N1 has detected theft of authentication credentials for user 0x7cfa40f92fd49bd1."

The publisher 601 publishes 609 the notification message to a predefined topic in the publisher-subscriber framework 611. The publisher-subscriber framework 611 makes the published notification message available 613 to subscribers who have subscribed to the topic.

A recipient subscriber node 615 retrieves 617 (or receives) the notification message and using the hash, determines 619 whether the user associated with the message is a user of the recipient subscriber node 615.

As noted, there are drawbacks to the method of anonymizing a user in the manner of the method of FIG. 6. First, nodes must use the same user-identifying information, e.g., user identifier, so that the one-way hash functions used to protect the user identity results in the same hash value. If a user uses two different user identifiers, the hash values would not be the same and the subscriber node would be unable to determine that it has the same user. Second, both parties must agree to use the same one-way function. Third, it reveals that a user subject to a notification message is a user of the publisher node. That member information may be considered sensitive and private information to both the user and the publisher node.

Let's first consider the third of these issues, protecting the membership of a user. To do so, the identity of the publisher node is protected. In a first embodiment, to avoid disclosing that an anonymized user has an account on the publisher node uses the topology described in association with FIG. 2, wherein published messages are sent via a trusted third party 211. A publisher node may send notification message to the trusted third party 211. The trusted third party removes any identifying information that can be used to identify the publisher and then makes the modified message available to the subscribers to the topic associated with the notification message.

Figure 7:
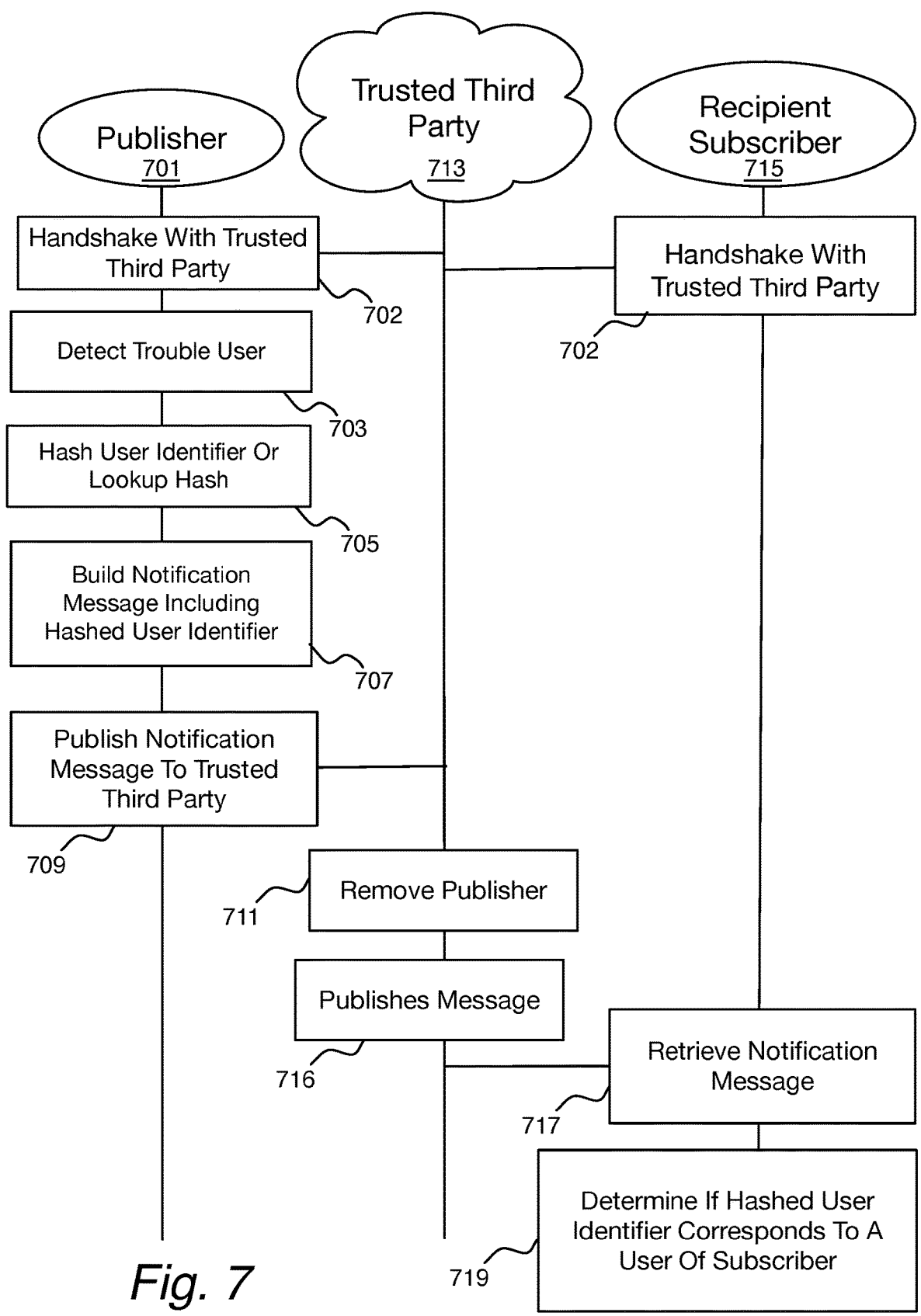
FIG. 7 is a timing sequence diagram illustrating a second mechanism for anonymizing user-identifying information in a publisher-subscriber framework.

FIG. 7 is an illustration of the mechanism of using a trusted third party 713, which corresponds to the trusted third party 211, to isolate the publisher node 701 from being disclosed in conjunction with a notification in regard to a particular user. Communication between nodes relies on indirect communication as illustrated in and described in conjunction with FIG. 2.

All the nodes, including the publisher node 701 and the recipient subscriber node 715 as well as any other nodes that are interested in participating in publishing or subscribing to messages in regard to user issues, establish 702 a handshake with the trusted third party 713 to register participation in the publisher-subscriber framework topic for user issues.

Steps 703 through 707 correspond directly to steps 603 through 607, respectively, the discussion of which is incorporated here by reference.

The publisher node 701 publishes the notification message to the trusted third party 713. The trusted third party 713 removes or anonymizes 711 the service-provider identifying information from the notification and publishes 716 the anonymized message.

Steps 717 and 719 correspond to steps 617 and 619 of FIG. 6, the discussion of which is incorporated here by reference.

In contrast to the mechanism of FIG. 6, the recipient subscriber nodes, while learning about issues regarding any of their users that are subject to a published notification message, the recipient subscriber nodes do not learn the identity of the originating publisher 701 and can, therefore, not deduce that the user has an account with the publisher 701.

Figure 8:
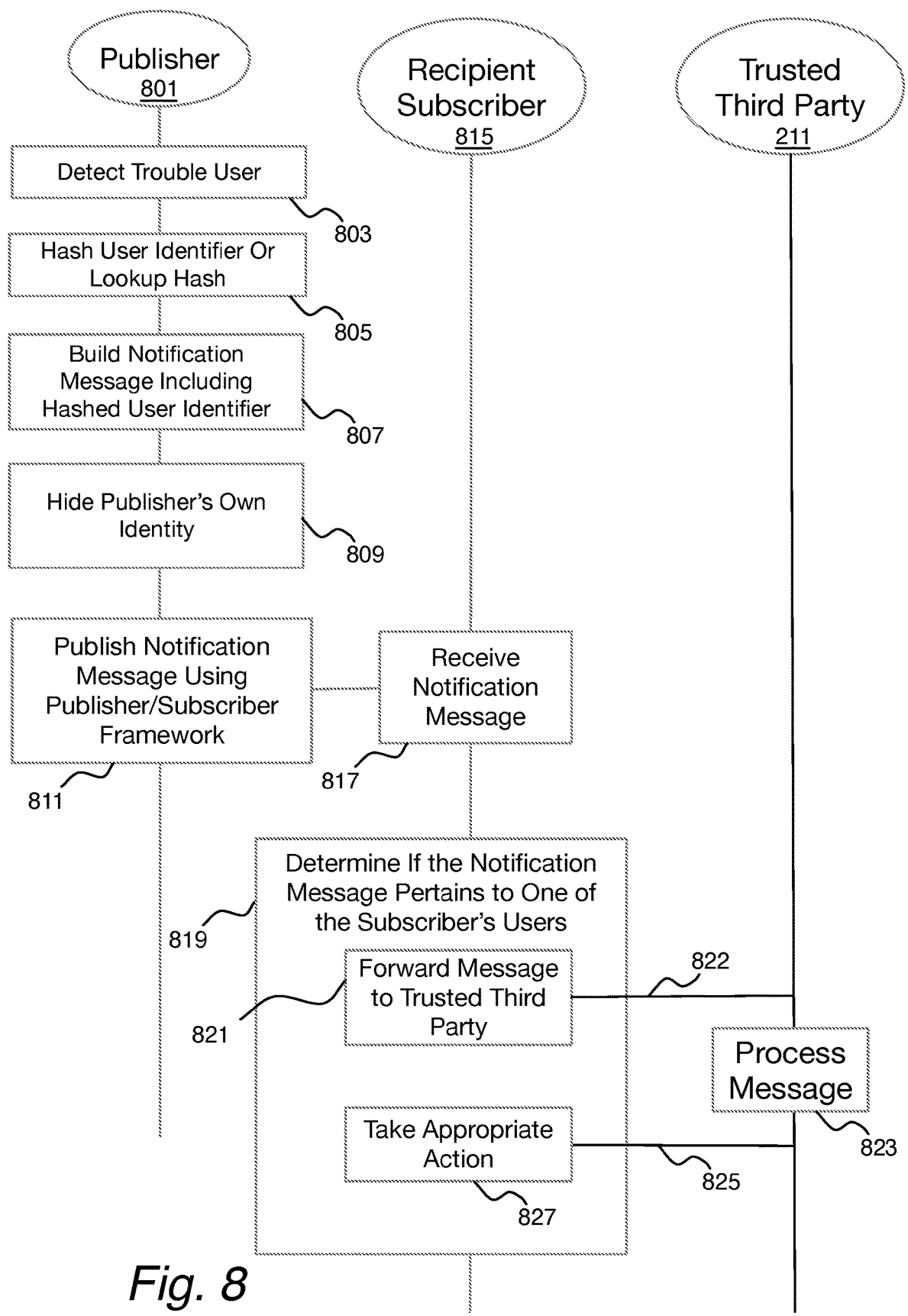
FIG. 8 is a timing sequence diagram illustrating a mechanism that uses direct communication as illustrated in FIG. 1 for a publisher node to hide its own identity.

In an alternative embodiment illustrated in FIG. 8, using direct communication as illustrated in and described in conjunction with FIG. 1, the publisher node 801 hides its own identity.

Steps 803 through 807 correspond directly to steps 603 through 607, respectively, the discussion of which is incorporated here by reference.

The publisher node 801 hides its own identity and adds it to the notification message, step 809. A publisher node 801 may hide its identifier in such a way that only the TP 211 can uncover, for example, using a public key of the TP 211 to encrypt the identifier, thereby allowing solely the TP 211 to decrypt the encrypted publisher identifier.

In an alternative embodiment, not requiring the use of a trusted third party, the publisher does not provide any identifying information in the notification message that can be linked back to the publisher. Rather the publisher signs the message using a group-signature scheme. A group signature scheme is a mechanism in which a member of a group can provide a cryptographic signature on a message that is indicative that the message is an authentic message in the sense that it originates with one group member. However, the signature, while confirming membership of the group, does not reveal which member has signed the message. Group signature schemes are known in the art and were first proposed in D. Chaum and E. van Heyst, *Group Signatures*, D. W. Davies (Ed.): Advances in Cryptology—EUROCRYPT '91, LNCS 547, pp. 257-265, 1991 Q Springer-Verlag Berlin Heidelberg 1991 and enhancements to the concept have been described in Boneh D., Boyen X., Shacham H. (2004) *Short Group Signatures*. In: Franklin M. (eds) Advances in Cryptology—CRYPTO 2004. CRYPTO 2004. Lecture Notes in Computer Science, vol 3152. Springer, Berlin, Heidelberg. https://doi.org/10.1007/978-3-540-28628-8_3.

Thus, when a subscriber receives a message signed using a group signature, the subscriber can verify that the message was signed by one of the nodes in the group. However, the subscriber cannot deduce which node signed the message and can, therefore, not deduce that the subject user has an account with the publisher.

The publisher node 801 publishes the notification message, including the hidden publisher identifier, on the publisher/subscriber framework, step 811, thereby making the notification message available to all other nodes, including a recipient subscriber node 815, step 817.

The recipient subscriber 815, upon receiving the notification message, seeks to determine whether the message pertains to one of its users, step 819, by forwarding, step 822, the notification message to the trusted third party 211, step 821.

The trusted third party 211 processes the notification message, step 823, and responds 825 with either the identity of the user who is the subject of the notification message or with a message indicating that the notification message has no relevance to the recipient subscriber node 815. The mechanism by which the trusted third party 211 processes the notification message is described in greater detail herein below in conjunction with FIG. 9.

Figure 9:
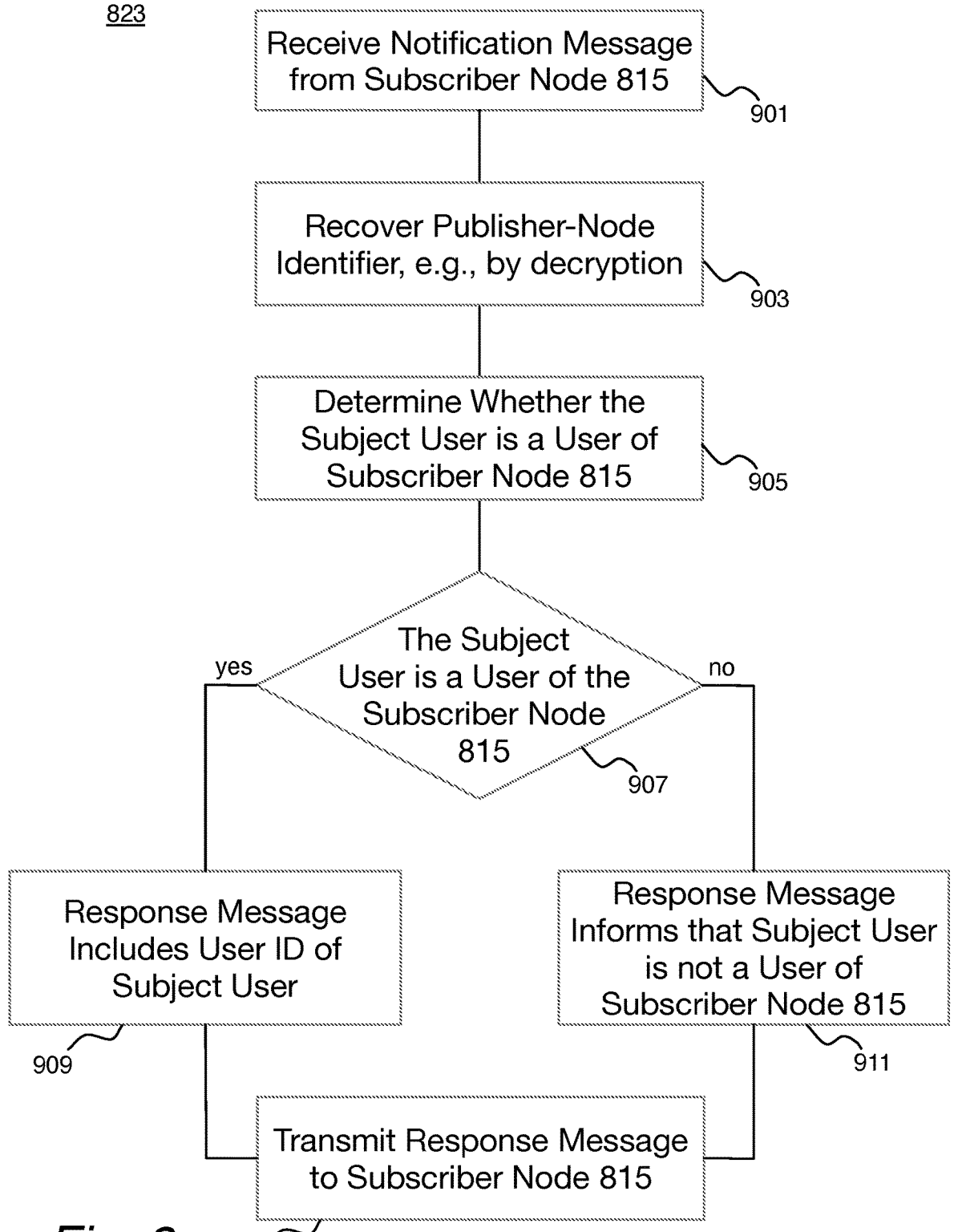
FIG. 9 is a flow-chart illustrating the process by which the trusted third party processes the notification message sent by the subscriber node.

FIG. 9 is a flow-chart illustrating the process 823 by which the trusted third party processes the notification message sent, step 822, by the recipient subscriber node 815. The trusted third party receives the notification message, step 901.

The trusted third party 211 recovers the node identifier for the original publisher node 801, step 903. For example, if the publisher node 801 hides the publisher-node identifier by encrypting it with the public key of the trusted third party 213, the trusted third party 213 decrypts the publisher-node identifier using the private key of the trusted third party 213.

The trusted third party 211 retrieves the subject user in the subscriber nodes' list of users to determine whether the subject user is a user of the recipient subscriber node 815, step 905. For example, if user identifiers are hashed values, the hashed value is searched for in the list of users for the recipient subscriber node 815.

If the subject user is a user of the recipient subscriber node 815, "yes" branch from decision step 907, the trusted third-party node 211 builds a response message that includes the user identifier of the subject user, step 909. Otherwise, "no" branch from decision step 907, the trusted third-party node 211 builds a response message that indicates that the subject user is not a user of the recipient subscriber node 815, step 911.

The trusted third party 211 transmits the response message to the recipient subscriber node 815, step 825.

Returning to FIG. 8, the recipient subscriber node 815 takes an action based on the received response message, step 827, e.g., terminates a session with the user or requests the user to re-authenticate or ignores the notification message if it is deemed not pertinent to the recipient subscriber node 815.

The above mechanisms remove information about the user from nodes who the subject user does not have an account with and protects membership of a user to a particular node from being divulged.

In a further embodiment, user-identity as well as service-provider membership are protected while allowing information pertinent to particular users to be published in a publisher-subscriber framework even when the user identifiers are not the same.

Figure 4:
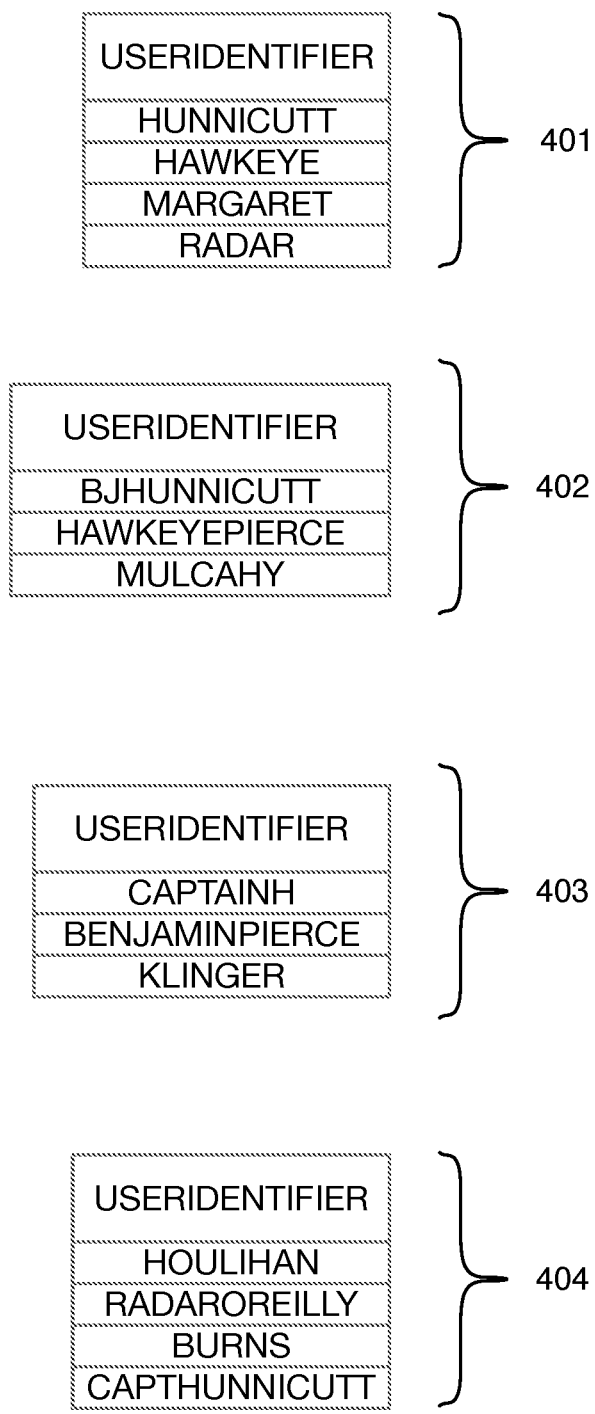
FIG. 4 is a schema of user-identifier tables like as shown in FIG. 3 wherein common users do not have identical user identifiers.

Consider the user-identifier scenario presented in FIG. 4, in which for the four nodes N1 through N4, several of the websites have common users while their user identifiers are different. FIG. 10, which corresponds to FIG. 4, illustrates the different hash results as shown in tables 1001, 1002, 1003 and 1004 when these user identifiers are hashed using the same hash function as used to produce the hash values provided in the example of FIG. 5. Quite clearly, it would be impossible for, for example, the node N3 having, the users in table 1003, to match a message about user HUNNICUTT from table 1001, which is a list of users for node N1, with the hash 0x1f2837c3c8765121 to user CAPTAINH as the hash for the latter is -0x1eb61b79ee0b69f5 in table 1003.

A trusted third party, e.g., the trusted third party 111/211 of FIGS. 1 and 2, respectively, provides a mapping between hashes of user identifiers from one node to hashes of user identifiers of another node. That mapping allows correlating messages to the correct user without providing actual user-identifying information or publisher-identifying information.

In this embodiment, while notification messages may be published to all subscribers of user information messages, the identity of the publisher node is encrypted using the public key of the trusted third party. As only the trusted third party is able to decrypt contents of a message that has been encrypted using its public key, only the trusted third party can determine the identity of the publisher. Therefore, even though, the other nodes received the notification message, they cannot discern the identity of the publisher node.

A subscriber node that has received a notification message requests the trusted third party to translate the received user identification and return the corresponding user identification used by the recipient-subscriber node. For example, if N3 receives the following message:

M1 =   "subject: 0x7cfa40f92fd49bd1, sender: mask(N1), event: "subject user has experienced an identity theft."

where the "sender: mask(N1)" is masking of a node-identifier for N1, for example using the public key of the trusted third party, N3 may forward the message to the trusted third party. The trusted third party decrypts the value mask(N1) to determine that it corresponds to N1. The trusted third party maintains a database with entries that map nodes, the hash of their users' identities, and a common user identifier that can be used to link users of different nodes.

FIG. 11 illustrates an example mapping table 1101 stored on a trusted third-party server 111 or a trusted third-party server 211. The trusted third-party server 1201 may further store a table 1103 containing masked names for all registered nodes. The masked names may be encryptions of the node names using a public key of the third-party server. Thus, the node names of table 1103 are corresponding decryptions using the private key of the third-party server.

Figure 12:
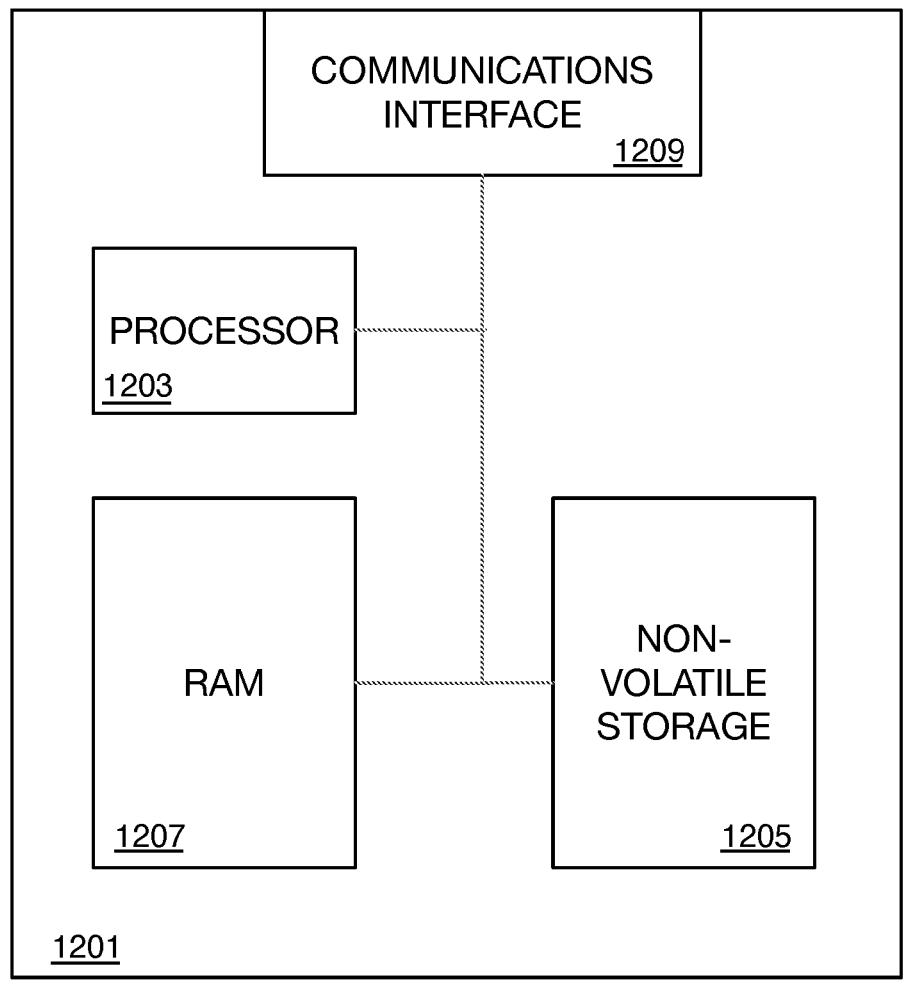
FIG. 12 is a hardware architecture of a trusted third-party server or another node.

FIG. 12 is a hardware architecture diagram of a third party server 1201, corresponding to trusted third party 111 or trusted third party 211. The trusted third-party server 1201 contains one or more processors 1203, a non-volatile storage 1205 for storing programs and data, a random-access memory 1207 for temporary storage of program data, and a communications interface 1209 for connecting to other servers, e.g., nodes 101-104 and nodes 201-204. The various nodes 101-104 and 201-204 may have similar structures.

The trusted third-party server 1201 may store the mapping table 1101 and masked-node-name table 1103 in the non-volatile storage 1205.

Figure 13:
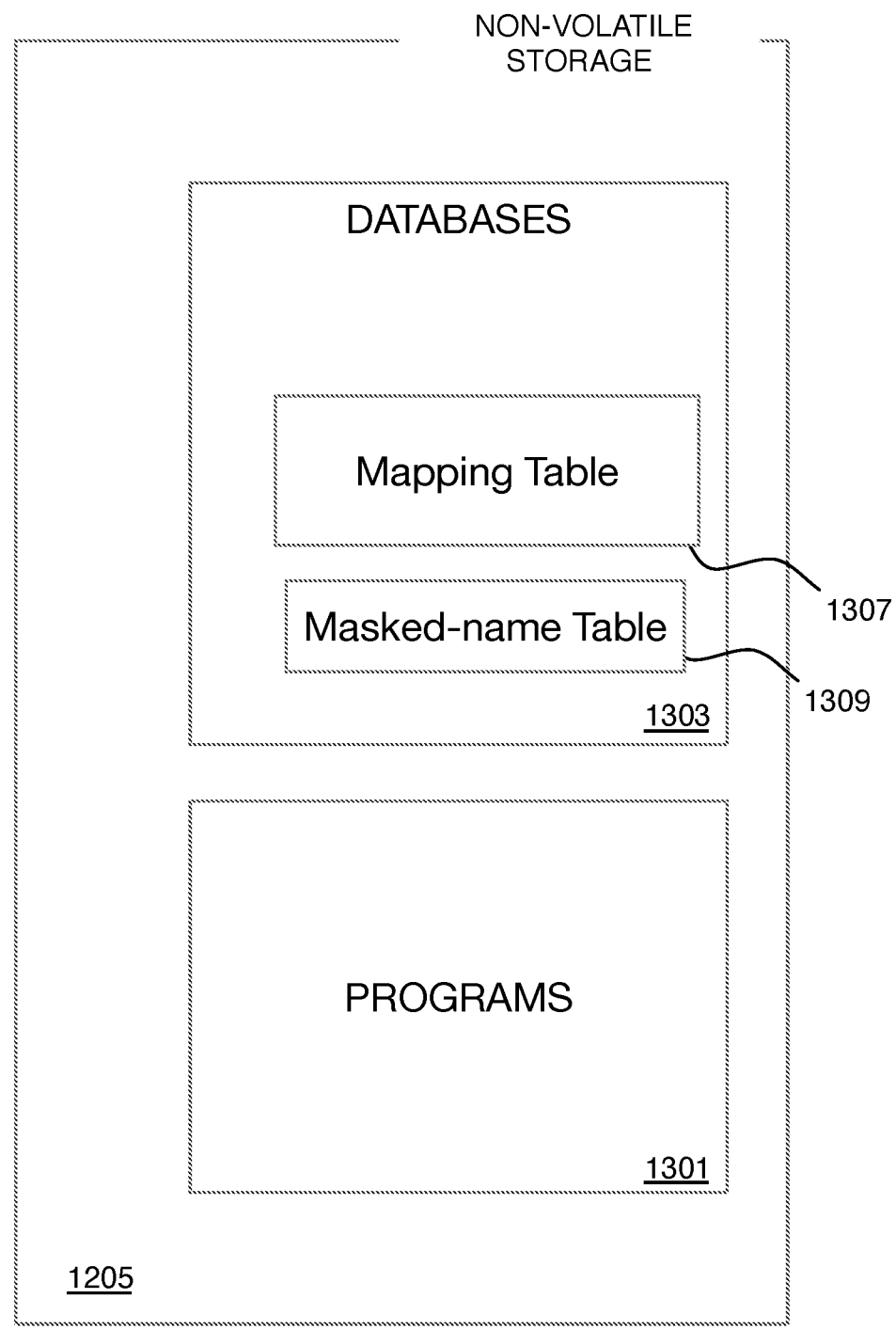
FIG. 13 is a layout diagram for non-volatile storage of the third-party server of FIG. 12.

FIG. 13 provides a high-level diagram illustrating storage layout in the non-volatile storage 1205. The non-volatile storage 1205 may contain programs 1301, including programs for directing the processor(s) 1203 to perform the mechanisms to protect user and node identity described herein. The non-volatile storage 1205 may also contain databases 1303, including a table 1307, like table 1101, for storing user-identifier hashes for each node in the publisher-subscriber network, and a table 1309, like table 1103, for storing unmasked node names corresponding to masked node names.

Figure 14:
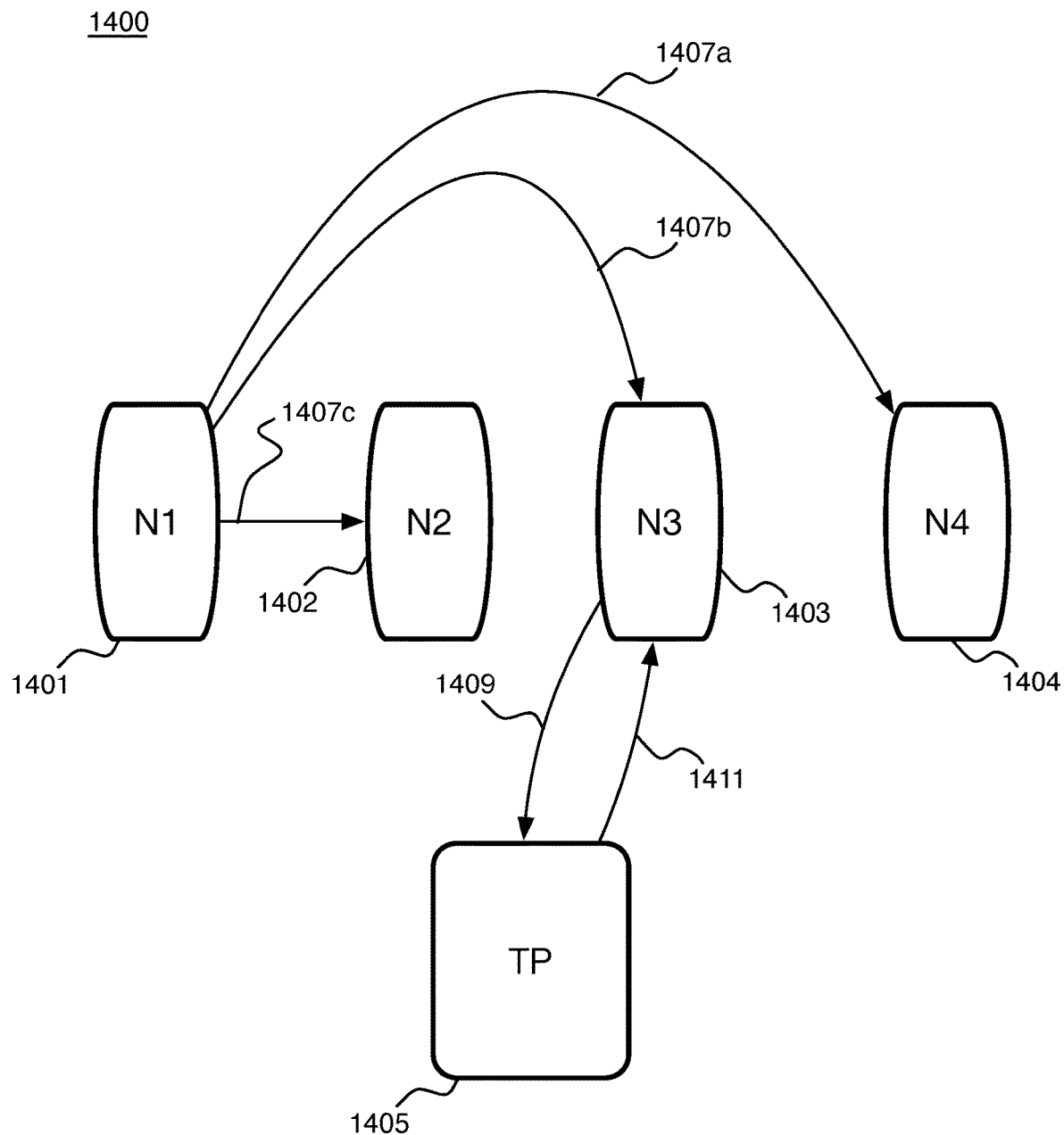
FIGS. 14 and 15 are message flow diagrams illustrating message flow between nodes and a trusted third-party node.

FIG. 14 illustrates a first example message flow 1400 between a first node N1 1401, a second node N2 1402, a third node N3 1403, a fourth node N4 1404, and a trusted third party 1405 that are connected to one another using direct communication as illustrated in FIG. 1. In this scenario, N1 1401 publishes 1407a, 1407b, 1407c a message that is transmitted directly to nodes N2 1402, N3 1403, and N4 1404. The message may also be transmitted to the trusted third party 1405, which corresponds to the trusted third party 111 of FIG. 1.

Let's consider the third node N3 1403. The third node N3 1403 may not have access to the user identifying information contained in the message and because the message does not carry the node identifying information of node N1 1401. Therefore, the third node N3 1403 may not know if the message is reliable.

To verify trustworthiness of the message and to obtain the user-identifying information that the third node associates with the user who is subject of the message, the node N3 1403 sends 1409 a message to the trusted third party 1405 requesting such trustworthiness confirmation and user-identifying information. The trusted third party 1405 replies 1411 to N3 1403 with a response to the request for trustworthiness confirmation and user-identifying information.

Figure 15:
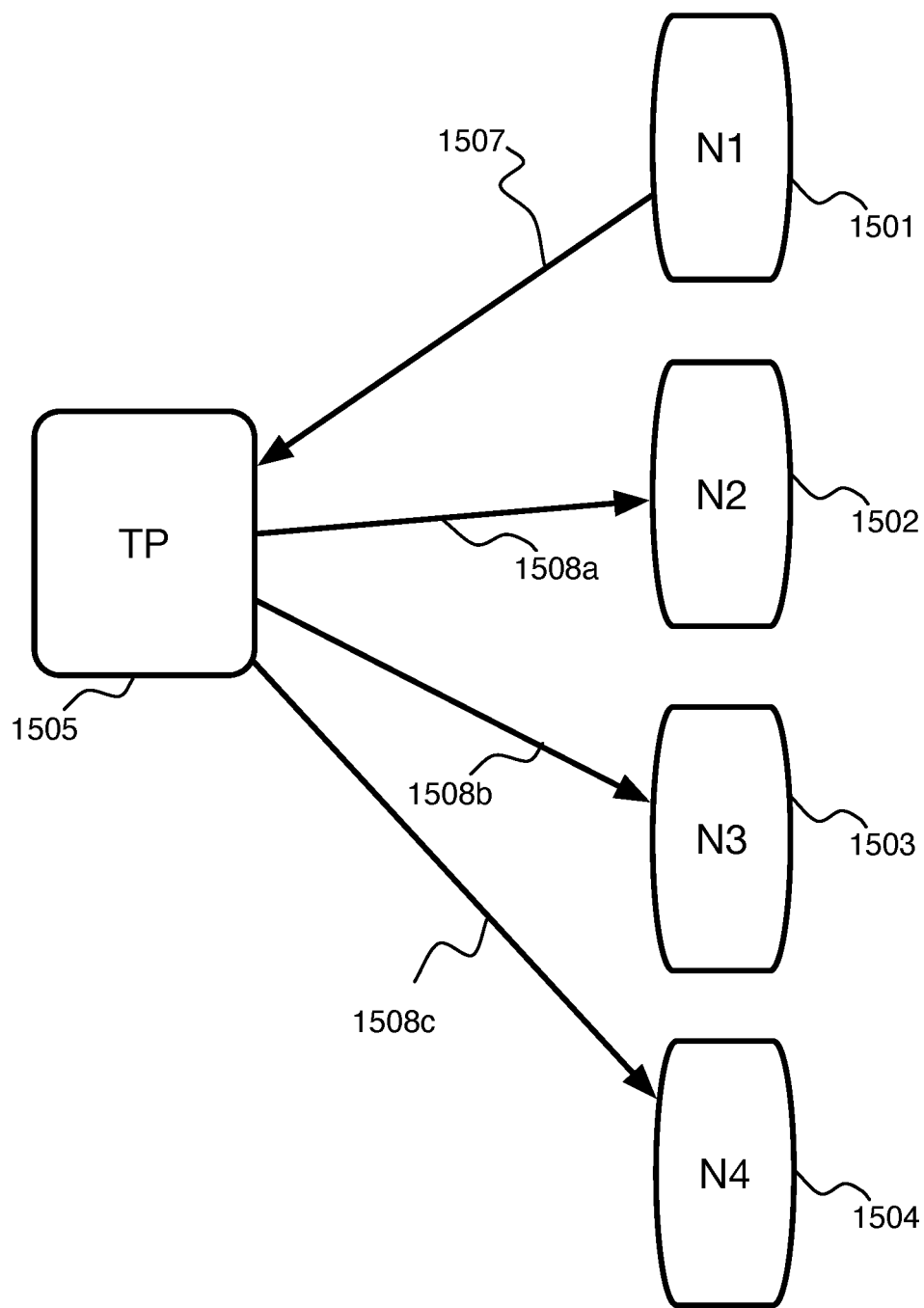

As illustrated in FIG. 15, the message flow may go via a trusted third party 1505. A node N1 1501 publishes the message 1507 to the trusted third party 1505, which corresponds to the trusted third party of FIG. 2, that converts the message content and forwards 1508*a-c* the message to the nodes N2 1502, N3 1503, and N4 1504.

The trusted third party 1505 determines the actual user, as defined by the TP USER ID field in table 1101 of FIG. 11, to which the notification message refers. If the node who requests trustworthiness confirmation and user-identifying information has the user as a user, the trusted third party 1505 responds with a trustworthiness confirmation and the hash of the user identifier that the requesting node associates with the user.

Figure 16:
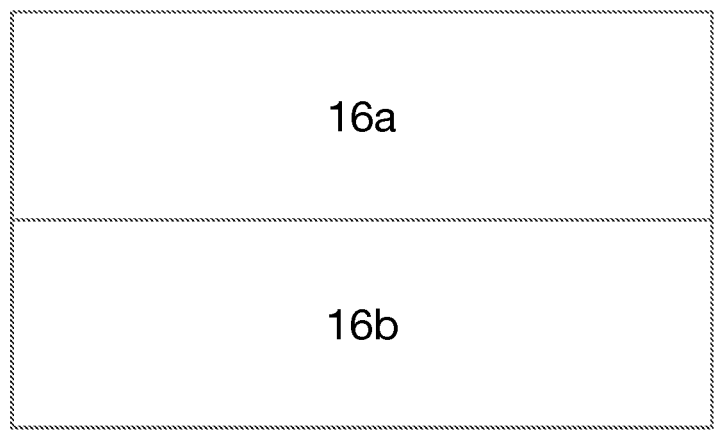
FIG. 16, which consists of FIGS. 16a and 16b, is a hybrid flow-chart and timing sequence diagram illustrating an example message flow for anonymizing user-identity and hiding the identity of the publisher node that issues a notification message in regard to a user of the publisher node in a publisher-subscriber framework.
Figure 16A:
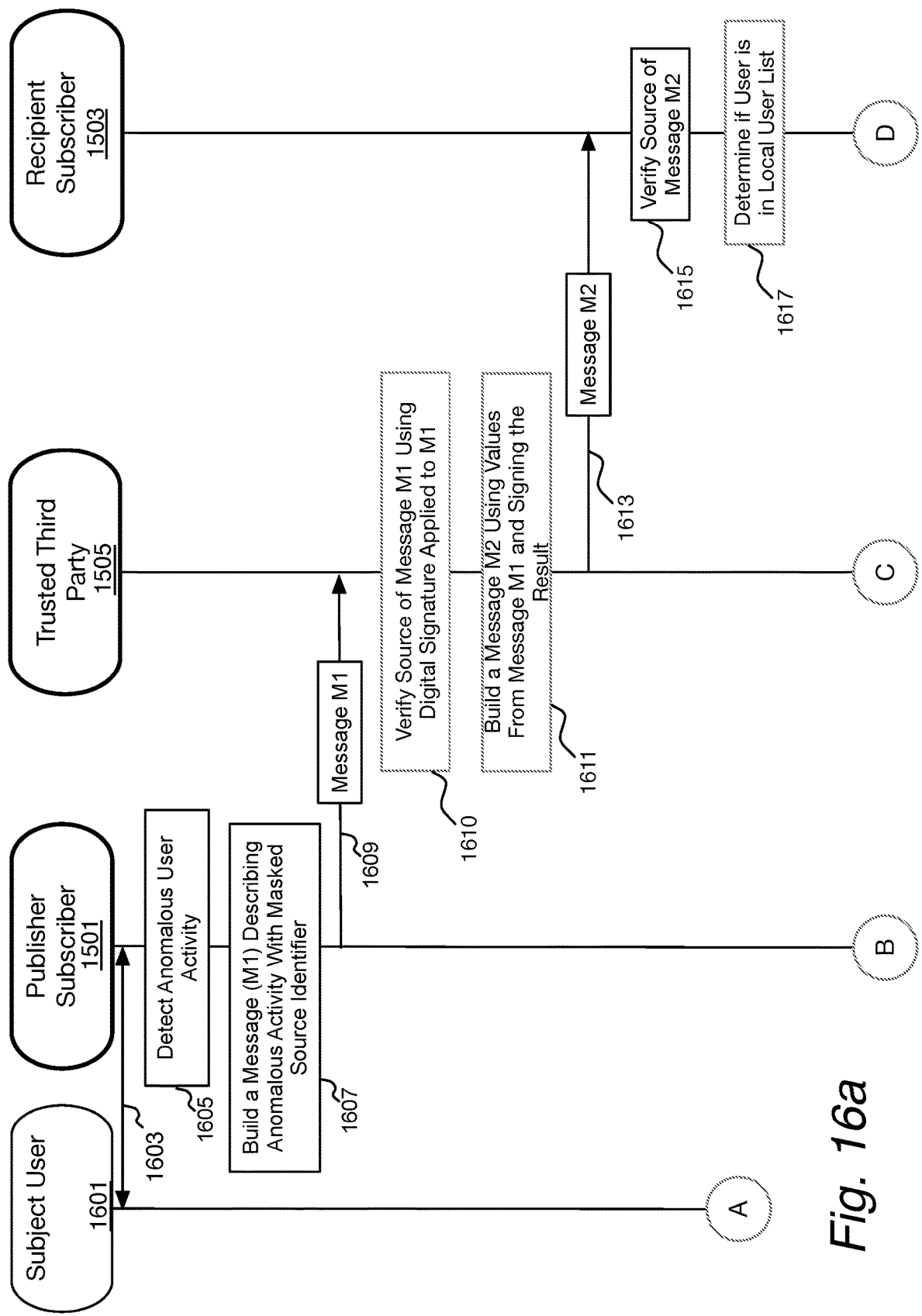
Figure 16B:
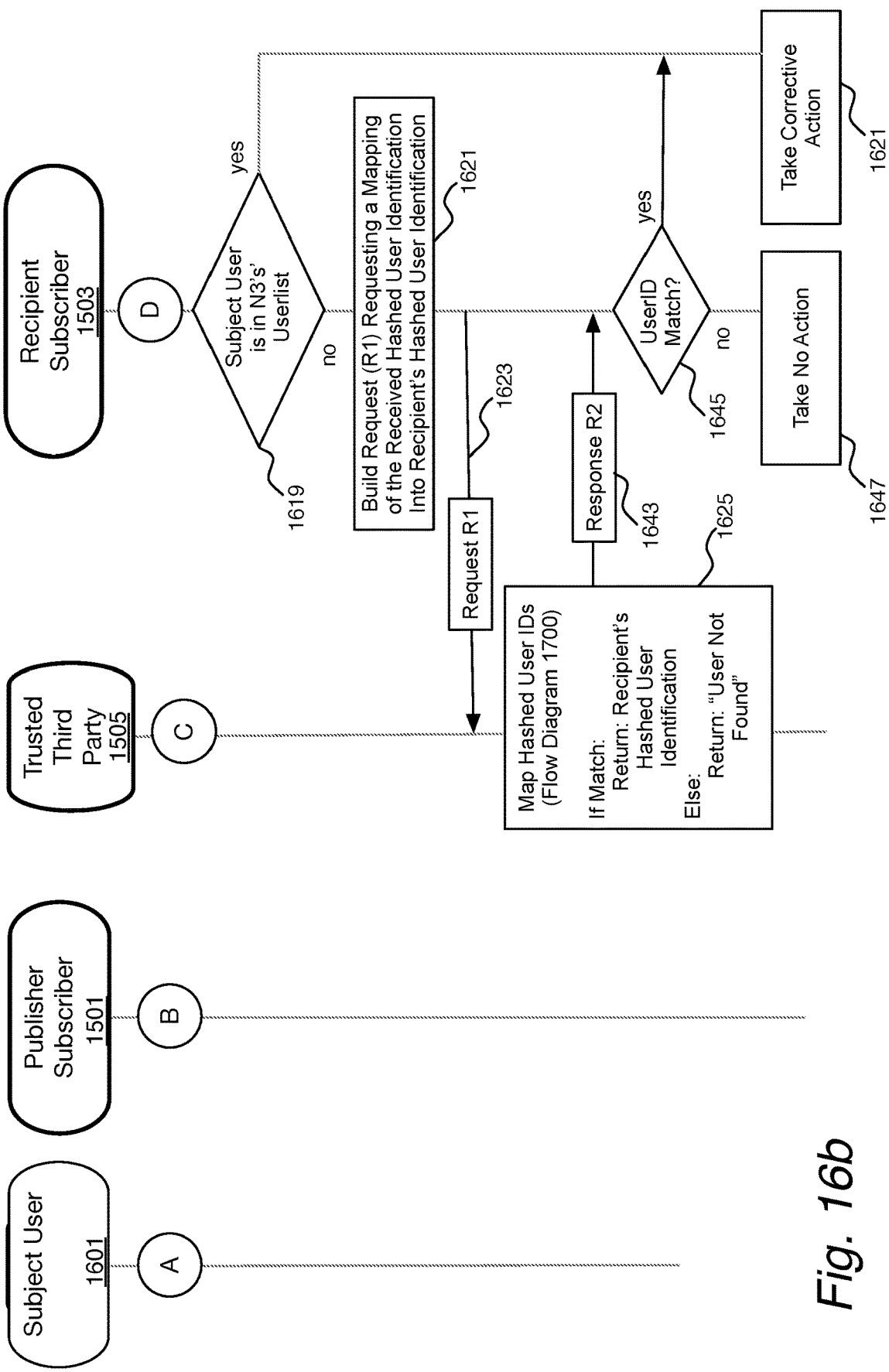

FIG. 16 is a hybrid flow-chart and timing-sequence diagram illustrating, from a high-level, a method for both hiding the source of a published event and anonymizing the user ID who is the subject of the published notification message in regard to a user of a node in a publisher-subscriber framework in a scenario in which different nodes use different user identifiers for the same user. In the mechanism illustrated in FIG. 16, a trusted third party serves the role of mapping hashed user identifiers from the user identifier of the originating node to a hashed user identifier used by the subscriber node. Message flow is via a trusted third party, i.e., in the manner illustrated in FIGS. 2 and 15.

Alternative embodiments may include a separate identity provider and trusted third party, e.g., the role of facilitating communication may be served by one node and the role of matching user identifiers may be served another node.

A subject user 1601 interacts with a first node 1501, step 1603. The activity can include accessing resources, downloading data, launching applications etc. The first node 1501, which may be any type of node, e.g., a bank, an online retailer, a particular department of an organization, a governmental agency, is referred to as the "publisher" node because, as described herein below, it elects to publish information concerning one of its users over a publisher-subscriber framework.

During the user interaction 1603 between a user 1601 and the publisher node 1501, the publisher node 1501 detects some anomalous activity on part of the user that should be reported to other nodes, step 1605.

The publisher node 1501 who detects the anomalous activity on the part of a user builds a message M1, step 1607. The message M1 has the following format:

M1 = {Sign(sender_node)[subject: Hash(subject_user_ID), sender: mask(sender_node_ID), event: event_details]} where,
subject_user_ID is the user identifier of the subject user. The user identifier is hashed, sender_node_ID is the node identifier of the publisher node. The node identifier of the publisher node is masked in a manner that only the trusted third party can unmask, and event_details—message details describing the detected user activity.

Let's consider an example. Suppose the publisher node is node N1, having the MASKED NODE NAME of 0x6ac4303ab4d1de9c, from the Masked Node Name table 1103 of FIG. 11, the subject user is Captain Benjamin "Hawkeye" Pierce, and the recipient node is node N3. The user identifier that N1 uses for Capt. Pierce is "HAWKEYE" and the corresponding hash is "0x7cfa40f92fd49bd1". Conversely, node N3 refers to Capt. Pierce by the user identifier "BENJAMINPIERCE" with the corresponding hash of "0xb9ad828b0a33253". Therefore, N1 may build a message M1 as follows:

M1 = {Sign(sender_node)[subject: 0x7cfa40f92fd49bd1, sender: 0x6ac4303ab4d1de9c, event: "Subject user is suspected of having compromised credentials."]}

The publisher node 1501 sends the message M1 via to a trusted third party, step 1609. The node identifier of the publisher node 1501 is masked in a manner that only the trusted third party TP 1505 can unmask. One mechanism of masking the publisher node identifier is by encryption using a public key of the trusted third party 1505. To allow recipients to verify the source of the message M1, the publisher node 1501, digitally signs the message M1.

The trusted third party 1505 verifies the source of message M1 using the digital signature applied to the message M1, step 1610.

The trusted third party builds a new message M2 using values from message M1 and by signing the resulting message, step 1611. Thus, the new message M2 has similar content to the message M1. However, as the source of message M2 is the trusted third party rather than the publisher 1501, the messages are not identical.

The trusted third party 1505 forwards the message M2 to all subscriber nodes, including, for the purpose of providing an examples, recipient subscriber node 1503, step 1613. Because the message M2 is published by the trusted third party 1505, the perceived source of the message M2 is the trusted third party 1505 and, therefore, the subscriber nodes are unable to discern from the source of the message M2 that the originator of the message is the publisher of the message M1.

The message M2 has the format:

M2 = {Sign(TP)[subject: Hash(U1), sender: TP, event: event_details], ref: SourceRef} where, TP is the identity of the publisher and SourceRef is a reference to the original publisher of the message. Only the trusted third-party node (TP) 1505 can determine the meaning of the SourceRef reference. SourceRef is included in the message M2 so that the recipient can forward it and the trusted third party can discern the originator of the message.

For the above example, the message M2 may be a message as follows:

M2 = {Sign(TP)[subject: 0x7cfa40f92fd49bd1, sender: TP, event: "Subject user is suspected of having compromised credentials."], ref: 0x6ac4303ab4d1de9c} where, "0x6ac4303ab4d1 de9c" is a reference that the TP has assigned to the example message, see table 1103.

Alternatively, mask(sender node) can also be included in the message M2, provided the recipient nodes cannot unmask this information.

The recipient subscriber node 1503, the recipient of the message M2, verifies the message M2 is from a valid publisher, here the trusted third party 1505, step 1615.

To verify the source of M2, the recipient subscriber node 1503 may check the digital signature of the message M2. If the source cannot be verified, the recipient subscriber node 1503 ignores the message or executes an error protocol.

If the source of the message M2 is deemed trustworthy by the recipient subscriber node 1503, the recipient subscriber node 1503 determines whether the hashed user ID matches a user in the user-identifier database, directory, or list of user identifiers of the recipient subscriber node, step 1617. For example, if the originating publishing node is N1 with the user identifier list 1001 (FIG. 10), the subscriber node is N3, with the user-identifier list 1003, and the user associated with the message M1 is Captain Benjamin "Hawkeye" Pierce and, the user identifier is HAWKEYE in N1 and the hashed user identifier is 0x7cfa40f92fd49bd1, the subscriber node (N3), having the hashed user identifier 0xb9ad828b0a33253 for user identifier BENJAMIN-PIERCE, would be unable to discern that 0x7cfa40f92fd49bd1 refers to one of its users. However, if they have common user identifiers, and consequently, common hashes, the user matching could stop at this stage.

If the publisher node 1501 that created the message M1 uses the same user identifier as the recipient subscriber node 1503, "yes" branch from decision step 1619, the hash would match and the recipient subscriber node 1503 can take a corrective action as it considers appropriate, step 1621. However, if there is no such match, "no" branch from the decision step 1619, the recipient subscriber node 1503 may request for the trusted third party 1505 to map the received hashed user identifier with a user of the recipient subscriber node 1503.

When the subscriber node 1503 is unable to determine whether the received event is about one of its users, the subscriber node 1503 builds a request R1, which it signs, for a mapping of the hashed user identifier received in message M2 to the hashed user identifier as used by the subscriber node N3 1503, step 1621. The request format may be:

R1 = {sign(requester_node) [subject: Hash(subject_user), requester: requester_node, ref: SourceRef] }.

Where, Source Ref is the source of the message M1 and "requester" identifies the recipient subscriber node making the request.

e.g., to continue that above example,

R1 = {sign(N3) [subject: 0x7cfa40f92fd49bd1, requester: N3, ref: 0x6ac4303ab4d1de9c]}

The recipient subscriber node 1503 transmits the request R1 to the trusted third party 1505 for performing the mapping of the hashed user identifier received in the message M2 to a hashed user identifier as used by the recipient subscriber node 1503 if the user corresponding to the hashed user identifier is a user of the recipient subscriber node 1503, step 1623.

Again, the source reference (SourceRef) can only be interpreted by the trusted third party 1505 because the source reference is masked by or encoded by the trusted third party 1505 in a manner that only the trusted third party 1505 can decode.

Figure 17:
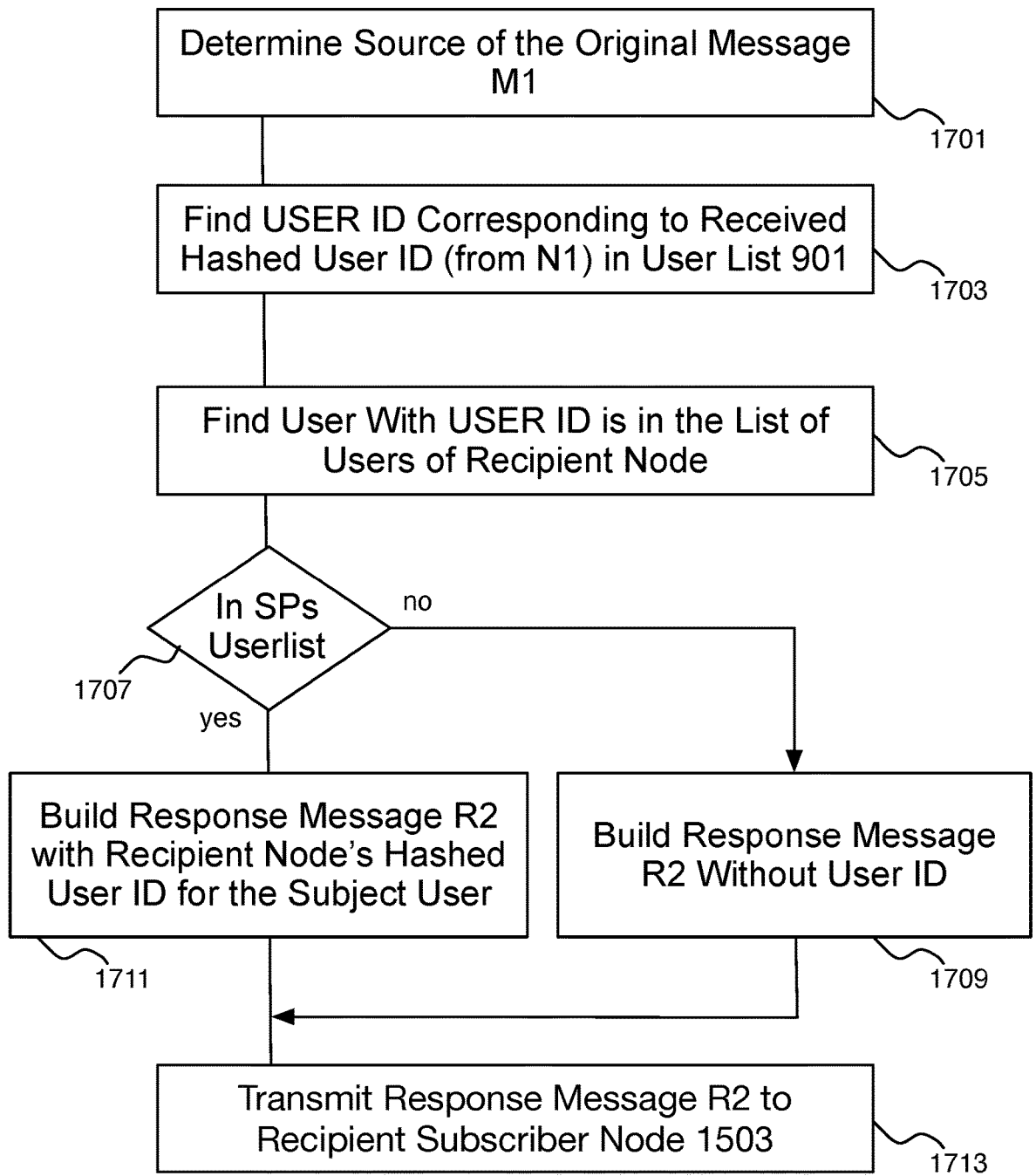
FIG. 17 is a flow-chart illustrating the process by which a trusted third party performs a mapping operation between a hashed user id used by a publisher node to a hashed user ID used by a recipient subscriber node.

The trusted third party 1505 maps the hashed user ID (Hash(U1)) used by the publisher node 1501, indicated by the masked source reference (SourceRef) from the message M2, to the hashed user identifier used by the recipient subscriber node 1503 if the user is in the user list of the recipient subscriber node 1503, step 1625. The method corresponding to step 1625 is illustrated as flow diagram 1700 of FIG. 17, which is a flow-chart illustrating the steps used by the trusted third party 1505 to map the hashed user identifier received in the request R1 to a hashed user identifier used by the recipient subscriber node 1503.

The trusted third party 1505 first determines the source of the original message M1 by unmasking the source reference SourceRef, step 1701. The source has been masked as described hereinabove. For example, the masking may be by encryption using a key for which only the trusted third party 1505 knows the decryption key. In that case, the trusted third party 1505 decrypts the masked source reference SourceRef to determine the source, here the publisher node 1501.

In the example, the SourceRef is 0x6ac4303ab4d1 de9c. Therefore, the trusted third party 1505 can look up that value in table 1103 and determine that the source of the message M1 is node N1.

If the masking is by some other masking function, the trusted third party 1505 applies an inverse function of that masking function.

The trusted third party 1505 looks up the hashed user ID from received request for the unmasked source ref, step 1703.

The trusted third party 1505 locates the corresponding hashed user identifier used by the publisher node in the user list that it maintains by looking up the record for the publisher node N1 1501 and the received hashed user identifier in the mapping table, e.g., mapping table 1101 of FIG. 11 or mapping table 1307 of FIG. 13.

Given the example above, if the mapping table, e.g., mapping table 1101 of FIG. 11 or mapping table 1307 of FIG. 13, has the data as show in table 1001 (FIG. 10), the identity provider would match hashed user identifier 0x7cfa40f92fd49bd1 to user identifier HAWKEYE for node N1 and that user identifier corresponds to a user having USERID equal to 1002 (associated with Captain Benjamin "Hawkeye" Pierce, not shown in the table).

The trusted third party 1505 finds the hash that the recipient subscriber node 1503, i.e., the requestor, uses for the subject user, step 1705. The trusted third party 1505 retrieves, in the mapping table 1101, the hash that the record for the recipient subscriber node 1503 and the determined USERID.

In the example, the trusted third party 1505 retrieves, in the mapping table 1101, that the hash for USER ID 1002 for node N3 is 0xb9ad828b0a33253, step 1705.

There is a match if both nodes have the same user. Conversely, if there is no match, the subscribing node does not have the user as one of its users and, therefore, the subscribing node is not entitled to the information provided in the published event.

If a match is not found, "no" branch from decision step 1707, the trusted third party 1505 builds a response message R2 indicating that there is no match and does not provide a hashed user identifier, step 1709. In other words, the recipient subscriber node 1503 is not provided information to identify the subject user. The recipient subscriber node 1503 can take no further action.

If a match is found, "yes" branch from decision step 1707, the trusted third party 1505 builds a response message R2 with the hash of the user identifier that the recipient subscriber node 1503 associates with the common user, step 1711.

The trusted third party 1505 sends, to the recipient subscriber node 1503, the response message R2, step 1713, which corresponds to step 1643 of FIG. 16.

In the example, the user that the trusted third party matched to Source Ref is User ID 1002 with the user identifier 0xb9ad828b0a33253 used by Node N3. Therefore, in that example, the trusted third party would respond with:

R2= {sign(TP) [subject: 0x7cfa40f92fd49bd1, ref: 0x6ac4303ab4d1de9c, your_userID: 0xb9ad828b0a33253]} from which node N3 would then know that the message M2 pertains to one of its users.

Returning to FIG. 16, if the recipient subscriber node 1503 receives a response, step 1643, indicating that there is no user match, i.e., that the user described in the message M2 does not correspond to one of its users, "no" branch of the decision step 1645, the recipient subscriber node 1503 ignores the message M2, step 1647.

On the other hand, if there is a match, "yes" branch of the decision step 1645, the recipient subscriber node 1503 can use the hash to identify the correct user identifier and take appropriate action, e.g., suspend the account of the user, step 1621.

Given the above sequence, the identity of the user, who is the subject of the published event, is only revealed to the subscriber nodes that have that user as one of their users.

The hereinabove described mechanism applies to messages that include information concerning more than one user. Applying the herein described techniques prevent subscriber nodes from discerning whether they have common users with other nodes.

In an alternative embodiment applicable to indirect communication, as illustrated in FIG. 2, the trusted third party 211 maps user identifiers when messages including user identifiers pass through the third party 211. This alternative embodiment includes a node N1 as the publisher node, which publishes a message concerning a user U1.1, where U1.1 is the user identifier used by the node N1 for a user U1. This alternative embodiment further includes a node N3 as the recipient subscriber node, i.e., a node that has received the message published by the node N1, and a trusted third-party node TP, which operates to map user identifiers from the received message to user identifiers used by other subscriber nodes.

This embodiment includes the following steps:
Step 1: a publisher node N1 transmits a message M1:

M1 =   {Sign(N1) {subject: Hash (subject: U1.1), sender: N1, event: event_details}}

Step 2: TP performs the following steps:
2.a Verifies source (N1) and converts U1.1 to TP User (U1.TP), i.e., a user identifier used by TP for the user U1, using a mapping table DB, e.g., such as illustrated in table 1101 of FIG. 11.
2.b Creates a list of node user hashes from User U1.TP (i.e., finds match with U1.3 from N3)
2.c Iterates of the list of user-id matches a publishes a message for each node that has user U1 as a user. E.g., if node N3 has a matching user, the trusted third party publishes a message:
M2={Sign(TP) {subject: Hash(U1.3), sender: TP, event: event_details} }. where U1.3 is the user identifier for user U1 used by node N3.
Step 3: N3 verifies source (TP) of the message M2, and acts upon event details for U1.3

In yet another embodiment, a trusted third party (TP) maps user identifiers without hashing as they are passed through using indirect communications as illustrated in FIG. 2. An advantage is that with such a mechanism, nodes are not required to implement security functions as the trusted third party performs the security functionality on behalf of the other nodes.

This embodiment includes the following steps:
Step 1: N1 sends a message M1={Sign(N1) {subject: U1.1, sender: N1, event: event_details} }.
Step 2: The trusted third party performs the following steps:
2.a Verify source (N1) and convert U1.1 to TP User (U1.TP) using user mapping table DB
2.b Create list of Node users from User U1.TP (i.e. Find match with U1.3 from N3)
2.c Iterate over list and publish message for each. For example, to N3:
M2={Sign(TP) {subject: U1.3, sender: TP, event: event_details} }.
3. N3 verifies source (TP) and acts upon event_details for U1.3.

The methods described in herein also apply to situations wherein one published message references a list of users. The privacy protection techniques described here prevent nodes from knowing if they have common users with other nodes.

With the described technologies, functionality-wise, there are
1. a manager that holds secret key or keys;
2. a directory holder that has users IDs;
3. a handler that passes messages, masks/encrypts/decrypts them as needed; and
4. participants.

The first three roles may be implemented by one or more trusted parties. For example, in a federated identity management system, an IdP can be a trusted party that plays the above three roles. IdP can also be a participant. Similarly, a service provider (SP) can be a mere participant, or a trusted third party. The herein-described technology does not impose any limitation on how nodes are configured. In general, each of the functional components of the ecosystem can include functionalities of other functional components.

In an alternative embodiment, any of the nodes can act as a trusted third party, taking the role of the identity provider in the above-described mechanisms. Any node may be a trusted third party to a subset of nodes.

OTHER EMBODIMENTS

A) A method for ensuring user privacy in a publisher-subscriber communications environment having at least one publisher node and a plurality of subscribers nodes in relation to publisher-subscriber communication regarding user activity, the method comprising:
storing, by a user-identifier mapping server, a user-identifier database mapping user identifier to subscriber-anonymized user identifier and subscriber identifier for users of said plurality of subscribers;
receiving, by the user-identifier mapping server, an encoded message, the encoded message concerning a user identified using an anonymized user identifier and wherein the user identifier of the user is anonymized using the one-way anonymization function; and
upon receiving, by the user-identifier mapping server, the encoded message, determining from the user-identifier database whether the user is a user of a second node and upon detecting that the user is a user of the second node, transmitting a decoded user-information message to the second node indicating that the first user is a user of the second node including a user identifier used by the second node for the user.

B) The method of A, wherein the second node is a recipient subscriber node, wherein the encoded message is an information-request message from the recipient subscriber node, the information-request message concerning a notification message from a publisher node, the notification message including the anonymized user identifier of the user, the user being a user of the publisher node and wherein the user identifier of the first user is anonymized using the one-way anonymization function; and wherein the decoded user-information message is a response message to the recipient subscriber node indicating whether the user is a user of the recipient subscriber node.

C) The method of B, wherein the notification message includes a masked identifier of the publisher node and the method further comprises a step of unmasking, by the user-identifier mapping server, the masked publisher identification to determine the corresponding publisher node.

D) The method of B, wherein the masked identifier is a public-key encryption of an identifier of the publisher encrypted with a public key of the mapping server and wherein the unmasking step comprises decrypting the masked identifier of the publisher using a private key of the user-identifier mapping server corresponding to the public key of the user-identifier mapping server.

E) The method of A, wherein the user-identifier mapping server is an identity provider server.

F) The method of A, wherein the first node and the second node are service providers.

G) The method of A, wherein the username is anonymized using a one-way function is a cryptographic hash function.

H) The method of A, wherein the username is anonymized using a one-way function pre-agreed upon between the user-identifier mapping server and the plurality of subscriber nodes.

I) The method of B, wherein the notification message includes an anonymized identifier of the publisher node, the method further comprising utilizing the anonymized identifier of the publisher node in the step of determining from the user-identifier database the user identity corresponding to the anonymized username of the first user.

J) The method of A, wherein the user-identifier mapping server is a trusted third-party server.

K) The method of B, wherein the information-request message contains a content relevant to a user corresponding to the anonymized user identifier and the response message further contains the content relevant to the user corresponding to the anonymized user identifier.

L) The method of A, wherein the encoded message is a publisher notification message from a publisher node, the publisher notification message including a user identifier of a first user of the publisher node; and wherein upon receiving, by the user-identifier mapping server, the publisher notification message, determining from the user-identifier database whether the first user is a user of the second node, building a subscriber node specific notification message for the second node, and wherein the decoded user-information message is a subscriber node specific notification message built specifically for the second node.

M) The method of L, further comprising upon the receiving, by the user-identifier mapping server, the publisher notification message, determining from the user-identifier database whether the first user is a user of any other subscriber nodes, for each such other subscriber node building a subscriber node specific notification message for such other subscriber node, and transmitting the subscriber node specific notification message to such other subscriber node.

From the foregoing it will be apparent that the herein described techniques provide an efficient and secure mechanism for preventing nodes that receive messages concerning user behavior in a publisher-subscriber framework from discerning the identity of a user who is not a user of the subscriber node and from discerning whether a user has a relationship, e.g., is a customer of, another node. Thus, in asynchronous communication frameworks, such as publisher-subscriber frameworks, where the communication is used to communicate information about users, the technology protects user identity from inadvertent disclosure, protects a user's membership at a publisher from inadvertent disclosure by hiding publisher identity, uses a trusted third party for authenticity checking of a publisher of messages, and uses the trusted third party for user identifier mapping.

Although specific embodiments of the invention have been described and illustrated, the invention is not to be limited to the specific forms or arrangements of parts so described and illustrated. The invention is limited only by the claims.

What is claimed is:

1. A method for ensuring user privacy in a publisher-subscriber communications environment having at least one publisher node and a plurality of subscribers nodes in relation to publisher-subscriber communication regarding user activity, the method comprising:
storing, by a user-identifier mapping server, a user-identifier database mapping user identifier to subscriber-anonymized user identifier and subscriber identifier for users of said plurality of subscribers nodes;
receiving, by the user-identifier mapping server, an information-request message from a recipient subscriber node, the information-request message concerning a notification message from a publisher node, the notification message including an anonymized user identifier of a first user of the publisher node and wherein the user identifier of the first user is anonymized using a one-way anonymization function; and upon receiving, by the user-identifier mapping server, the information-request message, determining from the user-identifier database whether the first user is a user of the recipient subscriber node and transmitting a response message to the recipient subscriber node indicating whether the first user is a user of the recipient subscriber node.

2. The method of claim 1, wherein the notification message includes a masked identifier of the publisher node and the method further comprises a step of unmasking, by the user-identifier mapping server, the masked publisher identification to determine the corresponding publisher node.

3. The method of claim 2 wherein the masked identifier is a public-key encryption of an identifier of the publisher encrypted with a public key of the mapping server and wherein the unmasking step comprises decrypting the masked identifier of the publisher using a private key of the user-identifier mapping server corresponding to the public key of the user-identifier mapping server.

4. The method of claim 1, wherein the user-identifier mapping server is an identity provider server.

5. The method of claim 1, wherein the publisher node and the recipient subscriber node are service providers.

6. The method of claim 1, wherein a username of a user is anonymized using the one-way anonymization function that is a cryptographic hash function.

7. The method of claim 1, wherein a username of a user is anonymized using the one-way anonymization function that is pre-agreed upon between the user-identifier mapping server and the plurality of subscriber nodes.

8. The method of claim 1, wherein the notification message includes an anonymized identifier of the publisher node, the method further comprising utilizing the anonymized identifier of the publisher node in the step of determining from the user-identifier database a user identity corresponding to an anonymized username of the first user.

9. The method of claim 1, wherein the user-identifier mapping server is a trusted third-party server.

10. The method of claim 1, wherein the information-request message contains a content relevant to a user corresponding to the anonymized user identifier and the response message further contains the content relevant to the user corresponding to the anonymized user identifier.

11. A user-identifier mapping server operable to ensure user privacy in a publisher-subscriber communications environment having at least one publisher node and a plurality of subscriber nodes in relation to publisher-subscriber communication regarding user activity, user-identifier mapping server comprising:
a processor,
a communications interface connected to the processor and to a network, and
a non-volatile storage facility connected to the processor for storing data and programs, the non-volatile storage facility comprising:
a user-identifier database mapping user identity to subscriber-anonymized user identifier and subscriber identifier for users of said plurality of subscriber nodes; and
program instructions to direct the processor to:
receive an information-request message from a recipient subscriber node, the information-request message concerning a notification message from a publisher node, the notification message including an anonymized username of a first user of the publisher node and wherein the username of the first user is anonymized using a one-way anonymization function; and upon receiving, by user-identifier mapping server, the information-request message, determine from the user-identifier database whether the first user is a user of the recipient subscriber node and transmitting a response message to recipient subscriber node indicating whether the first user is a user of the recipient subscriber node.

12. The user-identifier mapping server of claim 11, wherein the notification message includes a masked identifier of the publisher and the program instructions further direct the processor to unmask the masked publisher identification to determine the corresponding publisher identification.

13. The user-identifier mapping server of claim 12 wherein the masked identifier is a public-key encryption of an identifier of the publisher encrypted with a public key of the mapping server and wherein the unmasking instructions comprise instructions to decrypt the masked identifier using a private key of the user-identifier mapping server corresponding to the public key of the user-identifier mapping server.

14. The user-identifier mapping server of claim 11, wherein the user-identifier mapping server is an identity provider server.

15. The user-identifier mapping server of claim 11, wherein the publisher node and the recipient subscriber node are service providers.

16. The user-identifier mapping server of claim 11, wherein the username is anonymized using a one-way function is a cryptographic hash function.

17. The user-identifier mapping server of claim 11, wherein the username is anonymized using a one-way function pre-agreed upon between the user-identifier mapping server and the plurality of subscriber nodes.

18. The user-identifier mapping server of claim 11, wherein the notification message includes an anonymized identifier of the publisher node, the method further comprising for utilizing the anonymized identifier of the publisher node in the step of determining from the user-identifier database the user identity corresponding to the anonymized username of the first user.

19. The user-identifier mapping server of claim 11, wherein the user-identifier mapping server is a trusted third-party server.

20. The user-identifier mapping server of claim 11, wherein the information-request message contains a content relevant to a user corresponding to the anonymized user identifier and the response message further contains the content relevant to the user corresponding to the anonymized user identifier.

21. A non-transitory storage medium for storing instructions to direct a user-identifier mapping server to ensure user privacy in a publisher-subscriber communications environment having at least one publisher node and a plurality of subscriber nodes in relation to publisher-subscriber communication regarding user activity, the non-transitory storage medium comprising instruction to cause a processor of the user-identifier mapping server to:
store a user-identifier database mapping user identity to subscriber-anonymized user identifier and subscriber identifier for users of said plurality of subscriber nodes;

receive an information-request message from a subscriber node, the information-request message concerning a notification message from a publisher node, the notification message including an anonymized username of a first user of the publisher node and wherein the username of the first user is anonymized using a one-way anonymization function; and upon receiving the information-request message, determine from the user-identifier database whether the first user is a user of the recipient subscriber node and transmitting a response message to recipient subscriber node indicating whether the first user is a user of the recipient subscriber node.

22. The non-transitory storage medium of claim 21 wherein the notification message includes a masked identifier of the publisher node and the instructions further comprise instructions to cause the processor to unmask the masked publisher node identification to determine the corresponding publisher identification.

23. The non-transitory storage medium of claim 22 wherein the masked identifier is a public-key encryption of an identifier of the publisher node encrypted with a public key of the user-identifier mapping server and wherein the unmasking step comprises decrypting the masked identifier using a private key of the user-identifier mapping server corresponding to the public key of the user-identifier mapping server.

24. The non-transitory storage medium of claim 21, wherein the user-identifier mapping server is an identity provider server.

25. The non-transitory storage medium of claim 21, wherein the publisher node and the subscriber node are service providers.

26. The non-transitory storage medium of claim 21, wherein the username is anonymized using a one-way function is a cryptographic hash function.

27. The non-transitory storage medium of claim 21, wherein the username is anonymized using a one-way function pre-agreed upon between the user-identifier mapping server and the plurality of subscriber nodes.

28. The non-transitory storage medium of claim 21, wherein the notification message includes an anonymized identifier of a server node, for utilizing the anonymized identifier of the publisher node in determining from the user-identifier database the user identity corresponding to the anonymized username of the first user.

29. The non-transitory storage medium of claim 21, wherein the user-identifier mapping server is a trusted third-party server.

30. The method of claim 21, wherein the information-request message contains a content relevant to a user corresponding to the anonymized user identifier and the response message further contains the content relevant to the user corresponding to the anonymized user identifier.

* * * * *